E0152 XR 3,816,662 X358/85 X358/86 (3)

United States Patent
Shaver et al.

[11] 3,816,662

[45] June 11, 1974

[54] COMBINATION TELEPHONE AND VIDEO COMMUNICATION SYSTEM

[75] Inventors: David M. Shaver; Delbert A. Russell, both of Brockville, Ontario, Canada

[73] Assignee: GTE Automatic Electric Laboratories Incorporated, Northlake, Ill.

[22] Filed: Nov. 13, 1972

[21] Appl. No.: 306,107

[52] U.S. Cl. ................. 179/2 TV, 179/37, 179/2 A
[51] Int. Cl. .......................................... H04m 11/08
[58] Field of Search.... 179/2 TV, 2 DP, 1 CN, 1 H, 179/18 BC; 178/DIG. 13

[56] References Cited

UNITED STATES PATENTS

| | | | |
|---|---|---|---|
| 2,881,251 | 4/1959 | Strip | 179/2 DP |
| 3,050,584 | 8/1962 | Miller | 179/1 H |
| 3,484,561 | 12/1969 | Matthews | 179/1 H |
| 3,519,744 | 7/1970 | Dorros | 179/2 TV |
| 3,649,761 | 3/1972 | Bush | 179/2 TV |
| 3,684,833 | 8/1972 | Bush | 179/2 TV |
| 3,766,324 | 10/1973 | Budrys | 179/2 TV |

OTHER PUBLICATIONS

Key Systems for Picturephone Service, Bell Laboratories Record, Oct. 1971.

*Primary Examiner*—Kathleen H. Claffy
*Assistant Examiner*—Thomas D'Amico
*Attorney, Agent, or Firm*—K. Mullerheim

[57] ABSTRACT

A door intercom and entrance control system with video facility in which use is made of the telephone line of the desired resident to selectively enable the TV monitor in the called resident's apartment. All TV monitors are served by a coaxial cable terminating in a TV camera at the building entrance, in common. The enabling signal is in the form of a burst of above-speechband frequency which is transmitted, incident to a call from the entrance, ahead of the first splash of ringing frequency or call-waiting tone, as the case may be. Upon cessation of the enabling signal the signal receiver at the apartment end locks to the video received over the coaxial cable. A guard circuit is provided to prevent false triggering of the TV monitor due to spurious signals received over the telephone line.

14 Claims, 11 Drawing Figures

COMBINATION TELEPHONE AND VIDEO COMMUNICATION SYSTEM

BACKGROUND OF THE INVENTION

1. Field of the Invention

This invention relates to combination telephone and video communication systems with separate media for the transmission of voice and video. The invention relates more particularly to arrangements in such systems for selectively enabling, from a given location at which a video terminal is provided, another video terminal at a desired one of a plurality of remote locations.

In a more specific way the invention concerns itself with such an enabling arrangement in conjunction with intercom and door answering systems, for apartment or the like buildings, with a video facility which makes it possible for the tenant in an apartment both to converse with and see a visitor calling from an entrance of the building.

2. Description of the Prior Art

The usual method of providing video for apartment intercommunications systems is to assign one channel of the commercial cable TV system, when available, for this purpose. With this known method selective control of the picture is not possible. When a resident is signalled from the entrance by a visitor, the resident must switch on the TV set and turn to the assigned channel to view the visitor.

Again with this method, if the resident's TV set does not have the "instant-on" picture feature, a delay of, say, 30 seconds could occur before the picture is seen. This is the extent of the period which in typical apartment intercommunication systems of modern design is allowed for signaling a resident from the entrance before the visitor is cut-off and the switching equipment of the system restored to normal. Thus a visitor might assume that the resident was not at home if the latter, instead of answering the call immediately by lifting his handset, had waited for the video picture under the above circumstances. A further disadvantage of the described prior art method is that any resident can leave his TV set on the above-mentioned video channel and note the arrival and departure of residents and visitors at any time. Also to provide the video facility each resident must have a TV set, which may not always be the case.

A design for an entrance control system with video facility has previously been proposed, which was intended to assure privacy on door calls. However, for automatic video control this proposal contemplated the provision of separate control pairs to the video set in each suite — a technique which would considerably increase the cost of the overall system.

OBJECTS AND SUMMARY OF THE INVENTION

It is one of the objects of the invention to provide a combination telephone and video communication system with separate media for the transmission of voice and video, which insures privacy of video communication in an efficient and economical way.

It is a more specific object of the invention to provide a combination telephone and video communication system employing a video transmission channel, such as a coaxial cable, which, although being distinct from the audio transmission channels, is common to all of the afore-mentioned remote locations and yet insures privacy of video communication efficiently and economically.

More particularly yet it is an object of the invention to provide an intercom and door answering system for apartment or the like buildings which exhibits the attributes just mentioned.

The foregoing and other objects are attained, briefly, by using the telephone pair over which a call is initiated to the telephone at a selected remote location for uniquely enabling a video terminal at this particular location.

Thus, in the case of a door intercom and door answering system, when a visitor at a building entrance presses a pushbutton, or dials a number, to call the desired tenant a signal is sent over the selected resident's telephone line to enable the TV monitor in this tenant's apartment, thereby making it possible for only this particular tenant to see the visitor at the entrance. For the video transmission itself only one coaxial cable is required between the camera at the entrance — or the cameras at the entrances — of the building, and the TV monitors in the various apartments. The single cable preferably has drop-offs for each floor of the building. New buildings can readily be wired with such a coaxial cable which then serves the entrance control system only, providing closed circuit TV operation using the 0–10 MHz band and thus eliminating all possible interference with other equipment.

Alternatively it is also possible to use a coaxial cable system already existing in a building. In this case it is preferable to select a frequency outside of any of the VHF or UHF TV bands; considering that the operation is of the closed circuit type radiation problems will thus be minimal. It is also desirable to avoid the FM band as many CATV systems also carry these stations. However, there is a wide range between channels 6 and 7 which can be used if all radiation is prevented.

In the embodiment of the invention described hereinafter by way of example, the technique just mentioned has been described as integrated into an apartment telephone-intercom and door release system of the general type described and illustrated in U.S. Pat. No. 3,484,561 which issued to J. T. Matthews on Dec. 16, 1969. In this system an apartment-building intercom and door opening arrangement is combined with a regular telephone system in such a way that the tenant can communicate with the visitor from the regular telephone in his apartment over his two-wire subscriber line and can open the entrance or foyer door by the actuation of a calling device at his phone. In the Matthews system privacy of conversation is safeguarded for both intercom and central office calls. If, during the intercom conversation with the visitor, the tenant receives a central office call the tenant is signalled by the application of a call-waiting tone (or "intrusion" tone) to his line. Conversely, if the tenant receives a call from the door while he is busy in a central office call the door call is signalled to him by a different call-waiting tone. Upon receipt of this tone the tenant can switch himself to the door station and, at his choice abandon or hold the central office connection.

In the combination telephone and video door answering system according to the embodiment described hereinbelow, of the present invention a picture of the visitor is displayed on the desired resident's TV monitor — and on this monitor alone — as soon as the visitor depresses the pushbutton on the entrance panel, which is assigned to the resident's apartment. The TV monitors in the various apartments are primed and thus are of the "instant-on" picture type. If the resident is not busy in a central office call the picture is displayed on the monitor screen approximately 1 second before the first burst of distinct ringing is heard. On the other hand if the resident is busy in a central office connection the picture is displayed on the monitor screen about one second before the first burst of call-waiting or "intrusion" tone, indicating the presence of a visitor at the entrance, is received by the resident over the line.

In thus displaying the picture of a caller just before the first period of an audible signal, indicating the presence of a visitor, is applied to the resident's line, the resident is provided with the option of not answering the call of the visitor, or otherwise using his discretion in dealing with the call, for instance, if the resident has previously been subject to nuisance calls from the individual in question. In this fashion a further degree of privacy and security is provided by the display of the picture before the resident answers the call.

More specifically, the selection of a particular monitor is effected by applying to the particular resident's telephone line, preferably prior to the transmission thereover of the ringing current or the call-waiting tone as just explained, an above-speech frequency band signal which is used to "trigger" a transistorized monitor control circuit havings its input connected to the substation end of the tenant's telephone line and its output connected to the TV monitor near that substation. One such monitor control circuit is thus individually provided for each apartment. This signal which selectively enables the picture on this tenant's monitor screen, is connected to the tenant's telephone line for, say, 200 milliseconds, by a video control circuit which is a part of, or an adjunct to, the common switching equipment of the system. For this purpose the video control circuit includes, in addition to various other control and, if necessary, entrance identifying equipment, a 15.75 KHz. oscillator; 15.75 KHz. is a convenient frequency for this enabling signal since it corresponds to the horizontal oscillator frequency of typical video systems. Standard commercial type cameras and monitors may be used. Examples are Shibaden Camera Type HV-158 and Shibaden Monitor Type VM-502.

The camera is preferably fitted with a "panning" control unit to insure a more recognizable picture of the visitor since the latter may not necessarily be looking into the camera. It is also desirable to provide a shutter device for the camera which is opened at the time the "in-service" lamp lights in response to the initiation of a call. Since the camera, preferably, is continuously in standby condition, this feature in conjunction with the afore-mentioned "panning" control will tend to increase the life expectancy of the camera.

As mentioned above, a single coaxial cable is provided which is common to all apartment monitors and which may have drop offs for the individual floors of the building. When the video control circuit is activated by the depression of the resident's pushbutton, video information is applied to the coaxial cable and, hence, to all apartment monitors. However, since only the monitor control circuit for this particular resident detects the out-of-speech band enabling signal sent over this resident's telephone pair, a picture of the visitor is displayed only on the screen of this specific monitor. The horizontal synch pulses from the monitor are applied to the monitor control circuit and serve to hold the picture when the tone has ceased.

When the telephone call has been answered by the resident and the tenant has taken appropriate action — which may or may not include opening of the entrance door — disconnection of the call by either the visitor or the resident removes video from the coaxial cable. This stops the horizontal sync pulses to the resident's monitor control circuit and the picture goes off the screen.

A guard circuit is included in the monitor control circuit to prevent any other monitor from being triggered inadvertently from a spurious tone on a resident's telephone pair.

BRIEF DESCRIPTION OF THE DRAWINGS

The invention will be best understood by reference to the accompanying drawings in which a preferred embodiment has been illustrated by way of example. In the drawings.

DESCRIPTION OF THE PREFERRED EMBODIMENT

I. Detailed Description of the Video Control Circuit, FIGS. 1A and 1B.

Figure 1A:
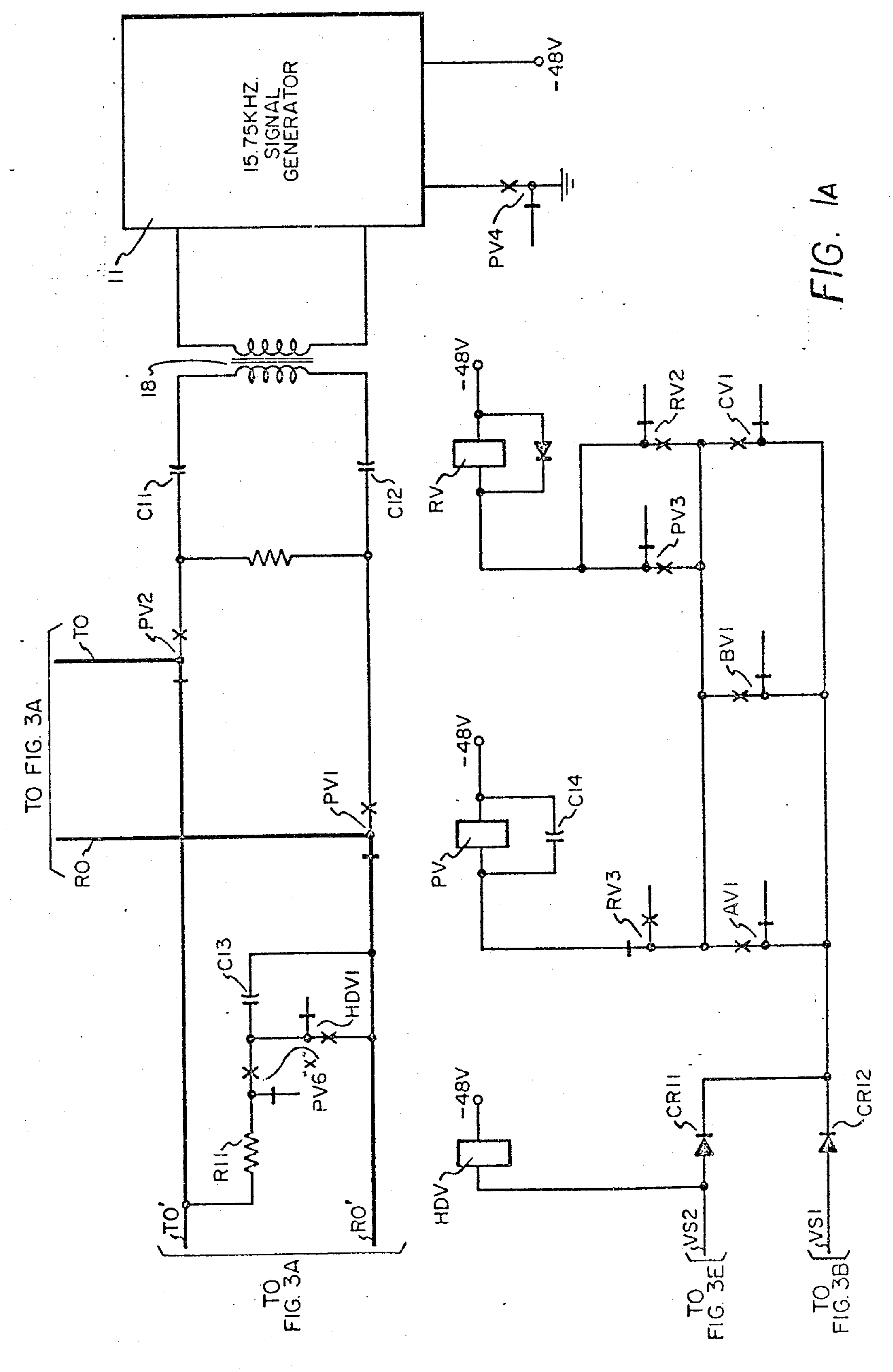
FIG. 1 of which one part is designated as FIG. 1A and another part as FIG. 2A, shows the video control circuit according to the invention, this circuit being provided as a part of, or as an adjunct to, the common switching equipment of an entrance control system.
Figure 1B:
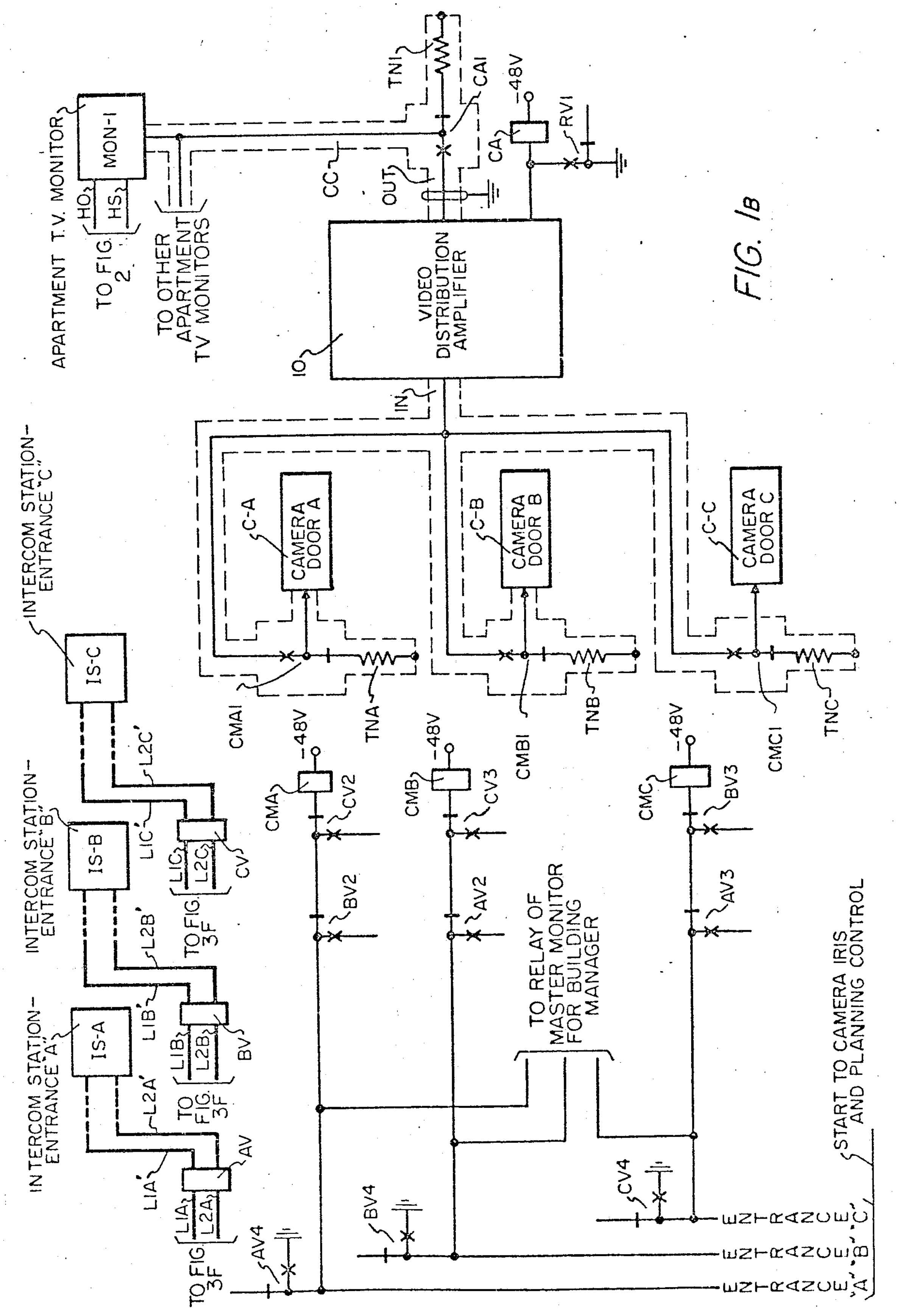

As shown in FIG. 1B, the video control circuit provides for three entrances to the apartment building and three cameras, C-A, C-B and C-C are installed, each at its respective entrance. Relays AV, BV, CV, FIG. 1B, determine which entrance camera is to be activated. Each of these relays is interposed in the loop circuit of the respective intercom station IS-A, IS-B or IS-C.

One separate TV monitor, such as MON-1, FIG. 1B, is provided in each apartment near the corresponding resident's telephone. The cameras and the monitors in the various apartments are interconnected by means of one single coaxial cable CC. The coaxial cable CC is provided with "drop offs" (not shown) of which one may be provided for each floor.

FIG. 1A shows the 15.75 KHz. signal generator 11, transformer 18, capacitors C11, C12, hold relay HDV and relays PV and RV which, in conjunction with FIG. 3, control the time and duration of the 15.75 KHz signal to be applied to the apartment line. The part of the circuit consisting of coaxial relays CA, CMA, CMB, CMC and the video amplifier 10, all shown in FIG. 1B, controls distribution of the video information to the apartment monitors. Also as indicated but not shown in detail in FIG. 1B, the video system can be used to provide facilities for the building manager, or a guard or a receptionist, to monitor all entrances at any time or only selected entrances.

Figure 3A:
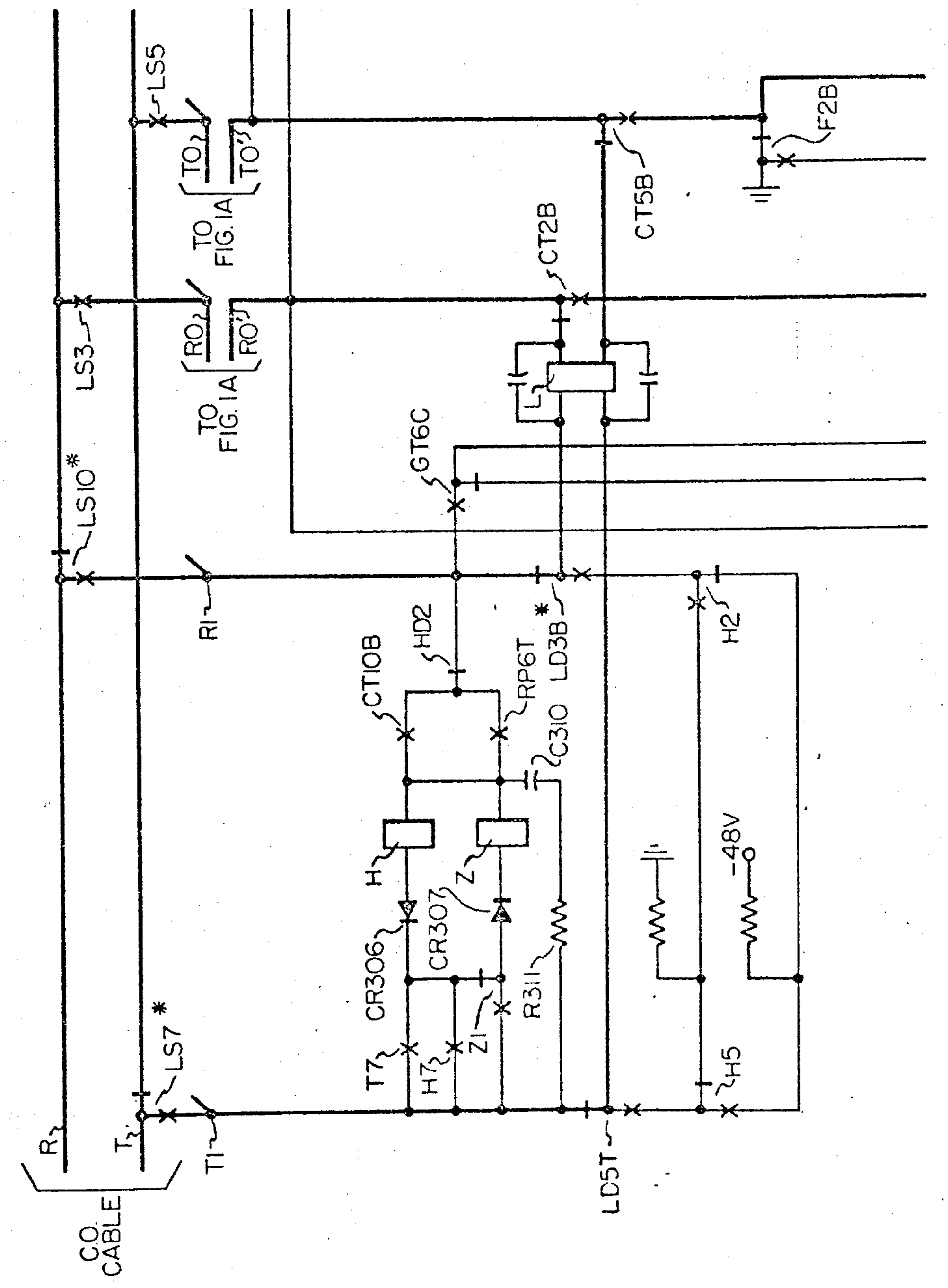
FIG. 3 which has been divided into seven separate parts, designated 3A to 3G, respectively, illustrates what may be referred to as the heart of the common switching equipment of the entrance control system; this part of the circuitry while typical in a number of respects has been adapted to cooperate with the circuits shown in FIGS. 1 and 2 to provide the features of the present invention.
Figure 3B:
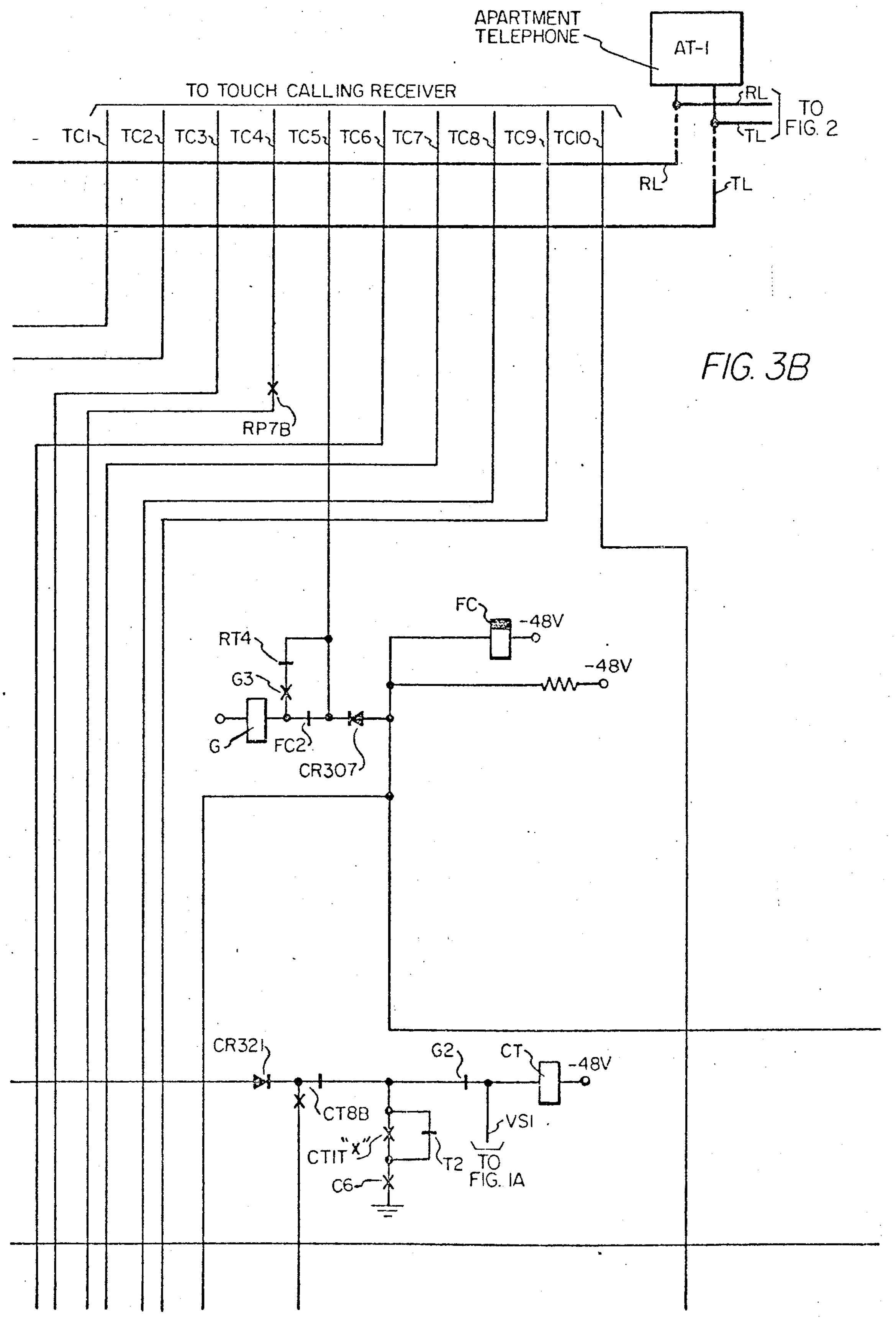
Figure 3C:
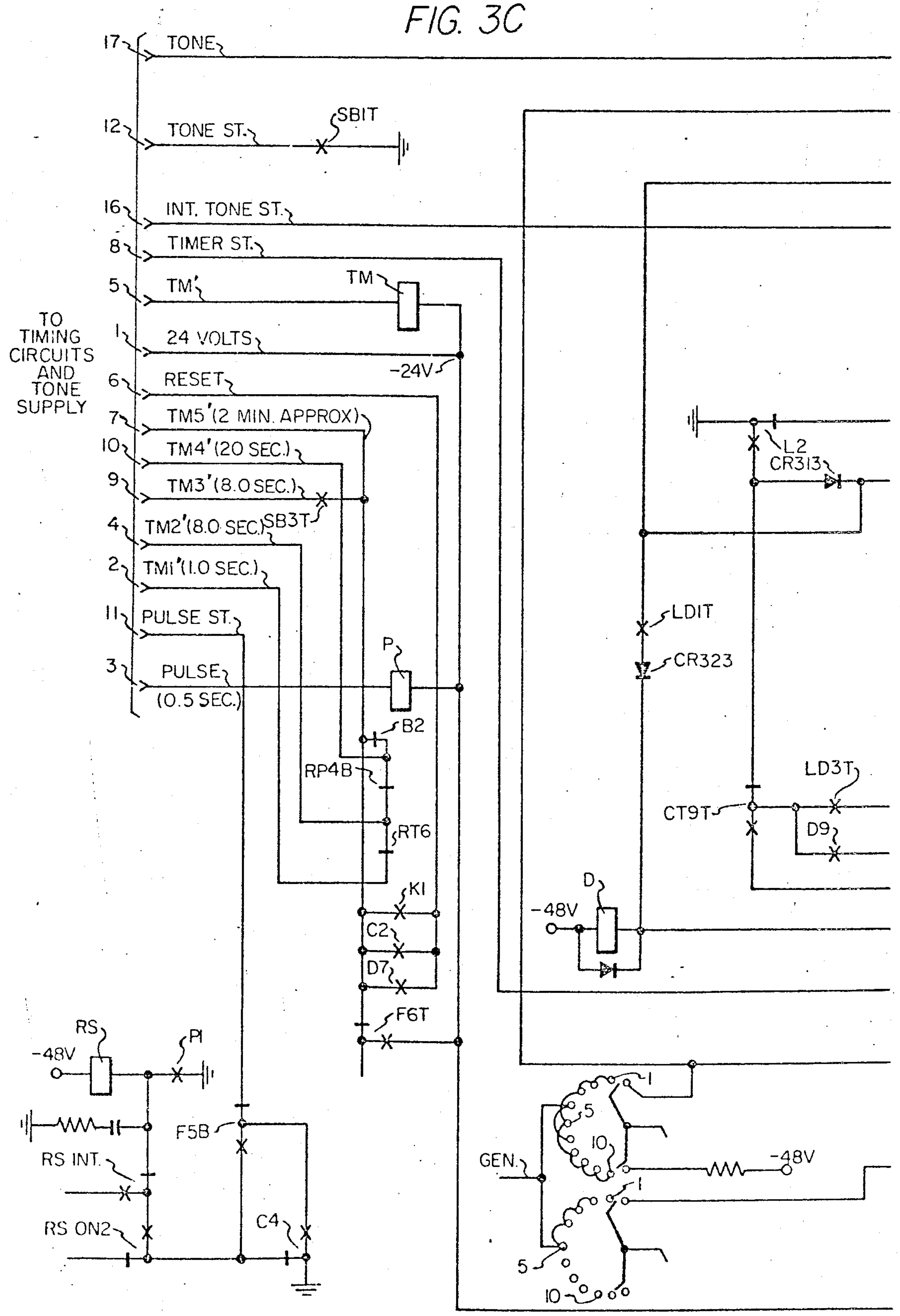
Figure 3D:
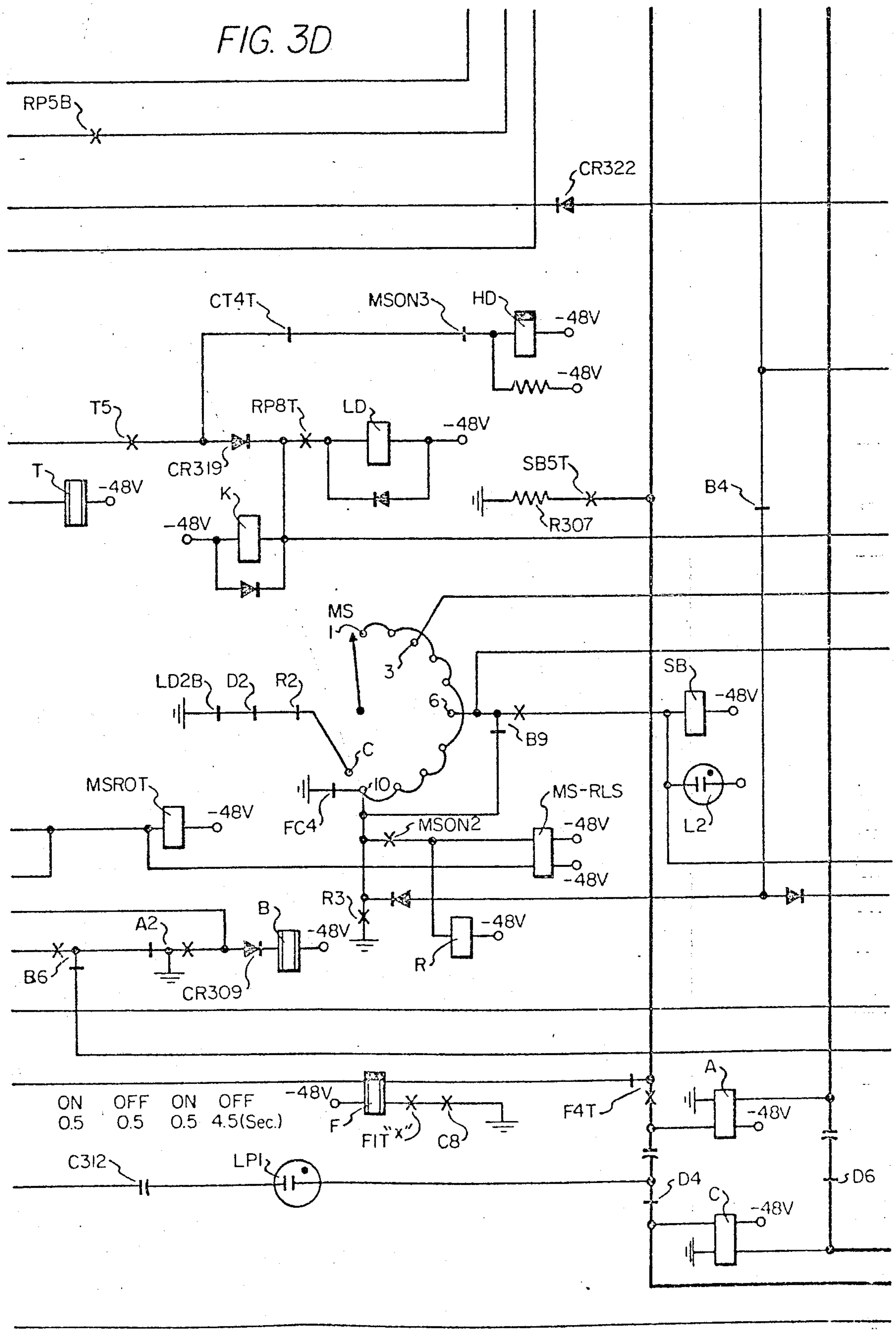
Figure 3E:
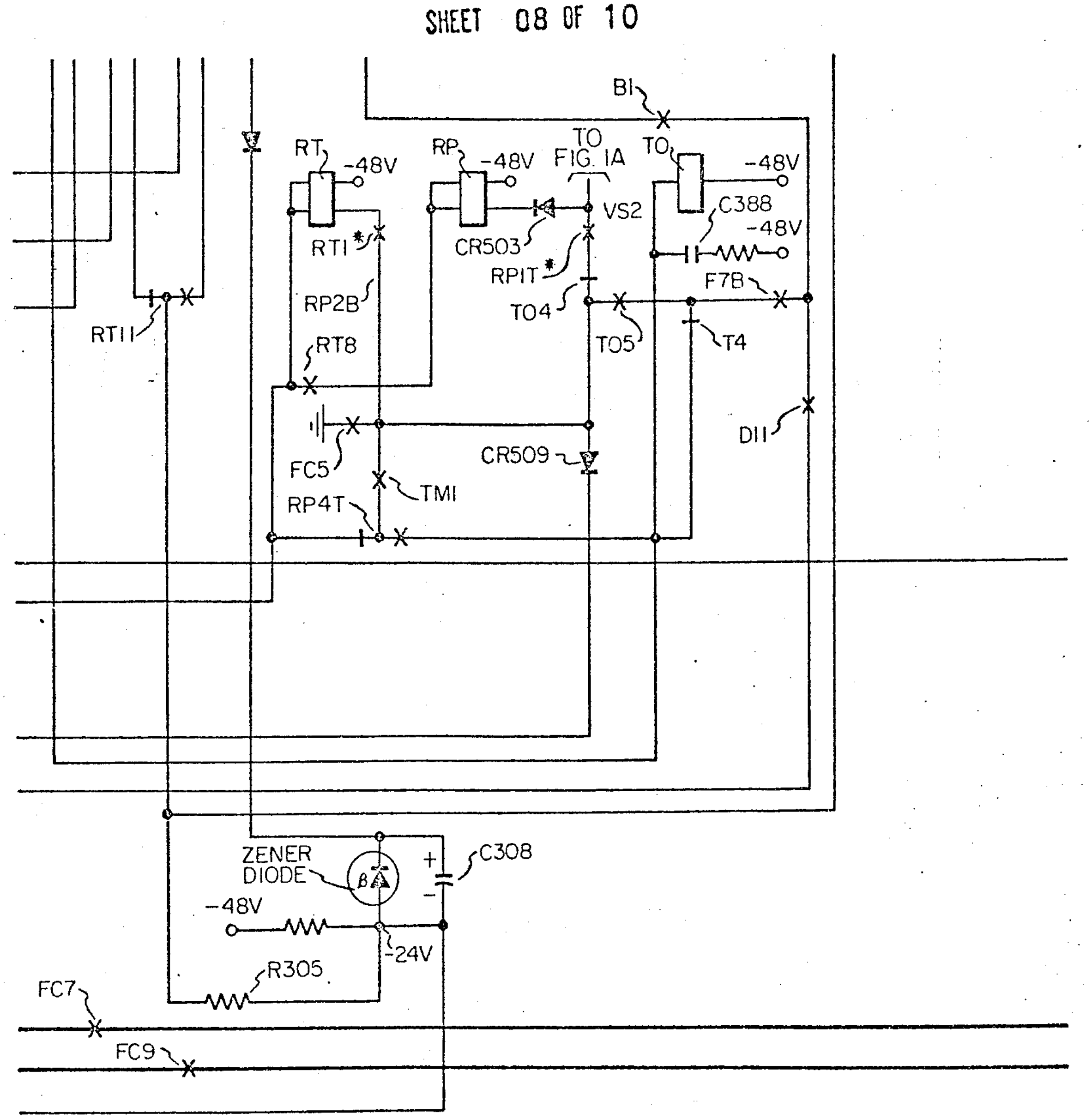

Two start conductors VS1 and VS2, FIG. 1A, originating at the common switching equipment, FIGS. 3B and 3E respectively, are provided to differentiate between an idle and a busy apartment telephone. The last-mentioned start conductor, VS2, is connected so that the equipment cannot interfere with the normal operation of an apartment telephone either when the tenant is engaged in a conversation with the central office or while he is dialing or keying digits.

In the operation of the video control circuit, FIGS. 1A and 1B, and as explained in greater detail in section III below, when a visitor operates a pushbutton on the entrance panel to call a resident, battery and ground from battery feed relay C, FIG. 3D, in the common switching equipment completes a circuit over the intercom loop circuit through the winding of relay AV, BV or CV, depending on whether the call originated from the intercom apparatus at entrance A, B or C, to operate the associated relay. Whichever of these relays operates, at the make portion of contact AV1, BV1 or CV1 prepares a circuit to relays PV and PR and at the make portion of contact AV4, BV4 or CV4 forwards ground to operate the associated coaxial relay CMA, CMB or CMC. Break contacts BV2, CV2 or AV2, CV3 or AV3, BV3, as the case may be, are included in the respective circuits to the coaxial relays as a matter of precaution. Make contact AV4, BV4 or CV4 also acts to start the panning device and to open the shutter of the camera at the appropriate door only, all as indicated in FIG. 1B. For the purpose of this explanation it is assumed that relays AV and CMA serving calls from entrance A have been operated.

As described hereinbelow in connection with FIG. 3, when a visitor operates an entrance panel pushbutton for a certain apartment there is a one second waiting period while the common switching equipment checks the apartment line for an idle or busy condition. If the line is idle relay G, FIG. 3B, of the common switching equipment restores closing ground to relay CT, FIG. 3B, and battery, and in parallel therewith, via the VS1 start conductor, diode CR12, FIG. 1A, the make portion of AV1, and the break portion of RV3, to the winding of relay P and battery. Relay P operates in this circuit. Diode CR12 keeps relay HDV from operating under this condition in order to prevent the operation of relay F, FIG. 3D, in the common switching equipment via PV6 and HDV1.

Relay PV, in operating, at preliminary make contact PV6 places an A.C. shunt including resistor R11 and capacitor C13 across conductors TO', RO'. This prevents any of the 15.75 KHz. signal from signal generator 11 from being fed back over the central office line, FIG. 3A, either inductively or otherwise, and from thus causing interference with the central office equipment, at PV1 and PV2 connects the apartment line to the signal generator by way of capacitors C11, C12 and transformer 18, while disconnecting this line from the central office line; at the make of PV4 completes the start circuit of 15.75 KHz. signal generator 11 so that the signal provided by this generator is applied to the apartment line; and at the make portion of PV3 completes a circuit extending from ground at conductor VS1 via CR12, AV1, and PV3 to the winding of relay RV and battery.

Relay RV in operating, at the make of RV1 operates relay CA and starts video distribution amplifier 10, if provided; at the make of RV2 closes a locking circuit for itself which extends from ground on the VS1 conductor via diode CR12, contacts AV1 and RV2 to the winding of relay RV and battery, and at the break of RV3 opens the circuit of relay PV so that this relay releases.

Relay CA, in operating, at the break-make contact CA1 removes the 75 ohm idle line termination TN1 and applies the video signal from the selected camera C-A to the video distribution system.

Due to its shunt capacitor C14, relay PV restores slowly, say with a delay of approximately 200 milliseconds; its contacts restore the apartment line to the common switching equipment, shut off the 15.75 KHz. signal generator and remove the shunt across the TO' and RO' conductors.

The foregoing sequence of events serves to apply an about 200 millisecond burst of 15.75 KHz. tone to the apartment line and the video signal is applied about 30 milliseconds after the start of this operation, the last-mentioned time interval being due to the combined operate time of relays RV and CA.

Figure 2:
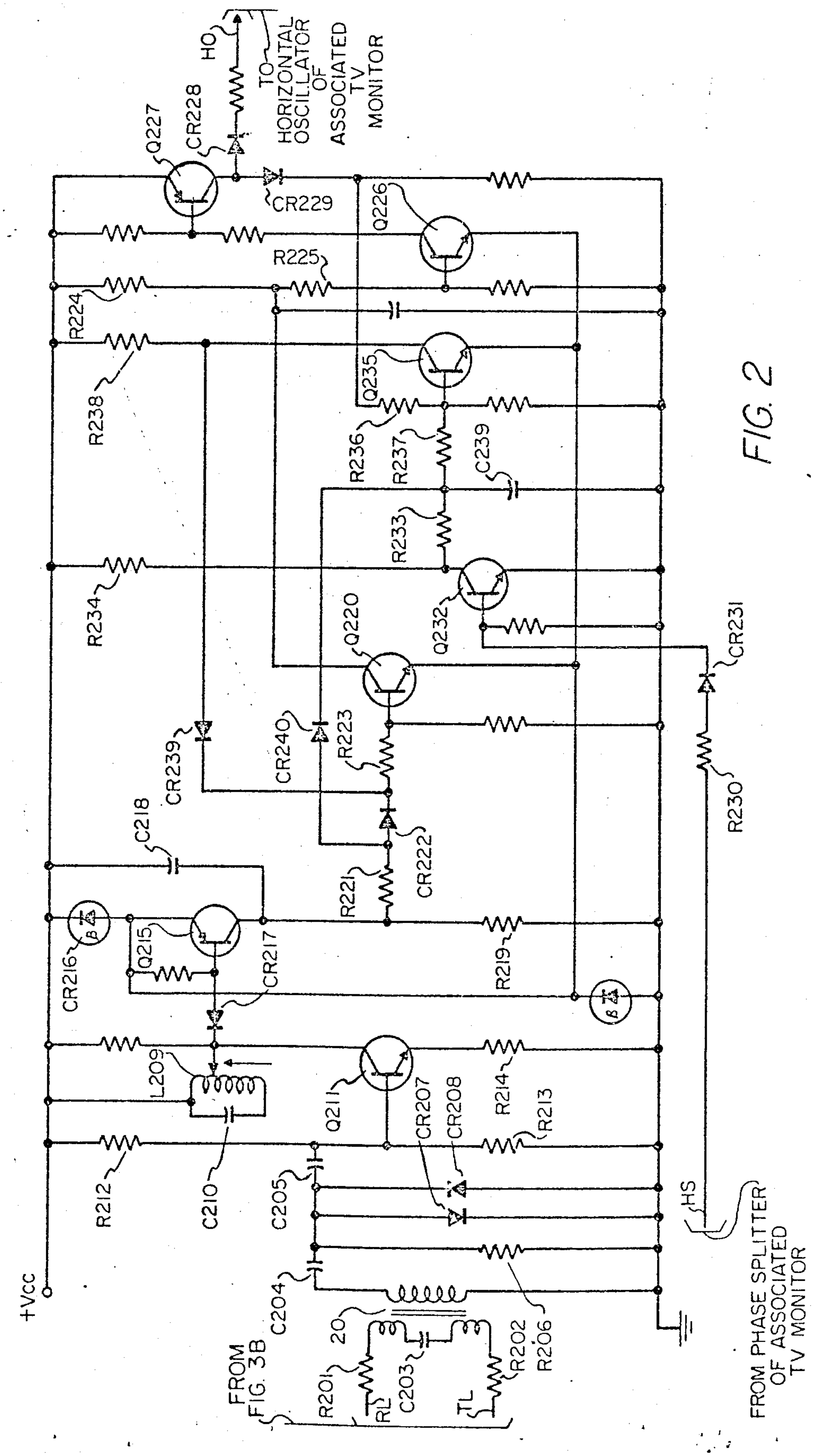
FIG. 2 shows the monitor control circuit according to the invention, a separate one of which is provided for each apartment or suite served by the system.

As will become apparent from the description given below of the common switching equipment, after the initial one second test of the apartment telephone line for a busy condition there is another 1 to 1.5 second silent period before ringing is applied to the apartment telephone by the common switching equipment, and all the foregoing video switching occurs during this period. As a result, the apartment monitor control circuit, FIG. 2, is activated about one second before the telephone rings to signal that a visitor is calling. As will be explained hereinafter, the detector and locking equipment at the monitor in each apartment is so designed that it must see the foregoing sequence of events or it will not "switch-on". The monitor locks on to the video signal itself.

Let us assume now that the resident's line is found busy. As explained hereinbelow, if during the initial one second busy test of the apartment line the common switching equipment engages a busy line, relays L and T, FIG. 3A, will operate, preventing the restoration of relay G, FIG. 3B, preventing the forwarding of ground on the VS1 conductor to start the video equipment, and introducing an eight second delay before the tenant is signalled or the video equipment started up. If the apartment resident is in the process of out-dialing, or out-keying, the common switching equipment will not signal the tenant or start up the video equipment for 8 seconds after the last digit of the called subscriber's number has been dialed, or keyed, by the resident.

In either case, at the end of the 8 second period relay RP, FIG. 3B, in the common switching equipment operates and ground will appear on the VS2 conductor to operate relay PV, FIG. 1A, as described above. However, in this case relay HDV also operates to place, at HDV1, a holding loop across line conductors RO', TO' via the make of PV6 and resistor R11, to forestall a release operation for the duration of the 200 millisecond signalling period during which the tenant's line is disconnected from the central office line. This will be explained in more detail hereinafter in conjunction with the description of the common switching equipment. Diode CR12 prevents the operation of relay CT, FIG. 3B, over the VS1 conductor.

II. DETAILED DESCRIPTION OF THE MONITOR CONTROL CIRCUIT, FIG. 2

Turning now to the description of the monitor control circuit, FIG. 2, one of these circuits, as previously mentioned, is connected across the line of each corresponding resident's telephone and is also interconnected with the corresponding TV monitor; it is from this TV monitor, too, that the monitor control circuit obtains its power supply. In the drawing it has been assumed that the circuit shown in FIG. 2 is connected with apartment telephone AT-1, FIG. 3B, and with TV monitor MON-1, FIG. 1B. The circuit, FIG. 2, accepts an out-of-speech band tone from the resident's telephone line, and it functions to enable the picture on the monitor over conductor HO. The horizontal sync pulses received over conductor HS from the phase splitter (not particularly shown) of the TV monitor are then used to hold the picture after the tone has ceased. The picture will disappear when the video is cut off and cannot be enabled until the tone is received again. The following sequence is the only one which will permit the picture to be viewed on the selected monitor: (1) Out-of-speech band tone is applied to the line. (2) The video signal is sent over the coaxial cable to the monitor which forwards horizontal sync pulses to the monitor control circuit. (3) The tone is removed from the line but the picture remains as long as the video signal is received. (4) When the video signal disappears the sync pulses are stopped, causing the picture to blank.

In the monitor control circuit, FIG. 2, a balanced D. C. blocking connection to the line is provided by resistors R201, R202, capacitor C203 and transformer 20. Capacitors C204, C205 and resistor R206 form a simple high pass filter having an impedance in excess of one megohm at the 20 Hz. ringing frequency. Diodes CR207 and CR208 clamp the input to the tuned amplifier to prevent damage from transients and to provide a constant level input for detection of the out-of-speech band tone. The frequency selective portion of this control circuit is provided by inductor L209 in parallel with capacitor C210. This tuned circuit is used as the collector load for transistor Q211. Resistors R212 and R213 bias transistor Q211 in the active region. The unbypassed emitter resistor R214 provides negative feedback greatly reducing the gain and make the circuit insensitive to transistor gain variations. The parallel resonant circuit exhibits high impedance at its resonant frequency which will cause the gain of this stage to increase greatly and produces large voltage swings above and below +12 volts.

Detection is accomplished by transistor Q215, zener diode CR216 and signal diode CR217. The emitter of Q215 is referenced 6 volts below the +12 volt bus Vcc and conducts only for base voltages below 5 volts (6 volts plus two diode drops below the 12 volt bus). When an out-of-speech band tone is received the tuned circuit will resonate producing a large swing at the collector of Q211. For those peaks below 5 volts, CR217 and Q215 will be forward biased. Transistor Q215 will turn on bringing the voltage at the junction of C218 and R219 to 6 volts. Capacitor C218 keeps the voltage from falling toward ground during the positive excursions of the Q211 collector.

At this point two conditions are possible:

If the tone is applied before the video the 6 volts at the junction of C218 and R219 will forward bias transistor Q220 via R221, diode CR222, and R223. Transistor Q220 turns on bringing the junction of resistors R224 and R225 to the emitter reference. The forward bias is now removed from the base of Q226. Transistor Q226 turns off removing the bias from transistor Q227. Transistor Q227 turns off allowing the junction of diodes CR228 and CR229 to float. The horizontal oscillator in the monitor is now enabled via conductor HO.

The video signal is now applied to the monitor via coaxial cable CC, FIG. 1B, causing the horizontal sync signal to forward bias Q232 via R230 and CR231. Transistor Q232 turns on grounding the junction of R234 and R233. Transistor Q235 now turns off since no current is flowing through R237 or R236 (Q227 is still off). Transistor Q235 turning off permits Q220 to remain on via the path R238, CR239 and R223. The circuit is now in a stable state and no longer dependent on the tone.

When the video disappears the horizontal sync signal will drop out removing the drive from the base of Q232. Transistor Q232 turns off allowing the junction of R223 and C239 to rise and forward bias Q235 via R237. Transistor Q235 turns on, removing the forward drive to Q220. Transistor Q220 turns off permitting the junction of R224 and R225 to rise forward biasing Q226. Transistor Q226 turns on and turns on transistor Q227 via resistor R241. The junction of CR228 and CR229 is clamped to +12 volts. The picture is now disabled.

If, on the other hand, video is applied before the tone, precautions are taken so that no monitor can be triggered inadvertently from a spurious tone on the subscriber pair when someone else has seized the common switching equipment. In this case the horizontal sync pulses appear on conductor HS before the tone, causing Q232 to turn on bringing the junction of R233 and C239 to ground. This causes the junction of R221 and CR222 to also be grounded via CR240 thus preventing Q220 from being turned on by the tone detector Q215. With Q220 off, the output stage cannot be turned on and the locking path via R236 and transistor Q235 is disabled. The picture will not appear.

At the termination of a call the transmission path to the entrance panel being used is opened and relay AV, FIG. 1B, releases. At AV1, FIG. 1A, ground is disconnected from the VS1 or VS2 conductor to release relay RV. At AV4, FIG. 1B, the camera at entrance A is shut off. Relay RV, in restoring, at RV1 releases relay CA and disconnects video distribution amplifier 10. Relay CA in releasing at CA1 removes the signal from the coaxial line and restores the idle line termination. Removal of the video signal to the monitor allows the latter to return to the standby state and the picture disappears.

III. DETAILED DESCRIPTION OF THE COMMON SWITCHING EQUIPMENT, FIGS. 3A TO 3G

1. Visitor to Resident Call — Resident's Line Free

1.1 Seizure from Entrance A

Let us again assume that the visitor at entrance A operates a selected pushbutton, for example pushbutton PB1A, FIG. 3C, corresponding to the selection from this entrance of apartment telephone AT-1, FIG. 3B. The associated LS relay — in the present example relay LS1 — operates from battery, lower winding of LS, pushbutton springs, resistors R304, and R306, break portion of make-before-break contact LO1 to ground. The two resistors R304 and R306 limit the current in the circuit so that not more than one LS relay can operate at the same time if more than one pushbutton is depressed simultaneously.

Figure 3F:
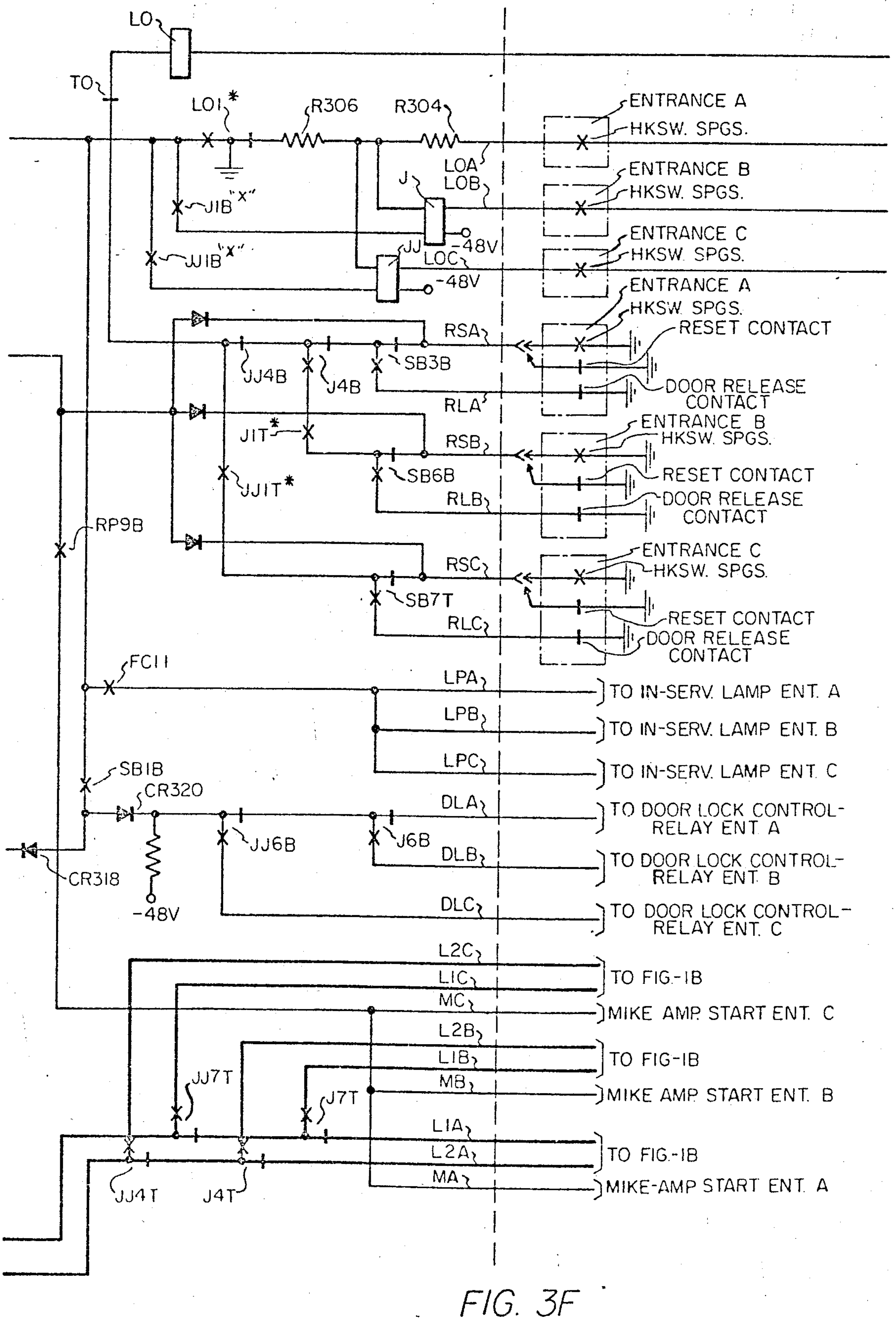
Figures 3G, 4:
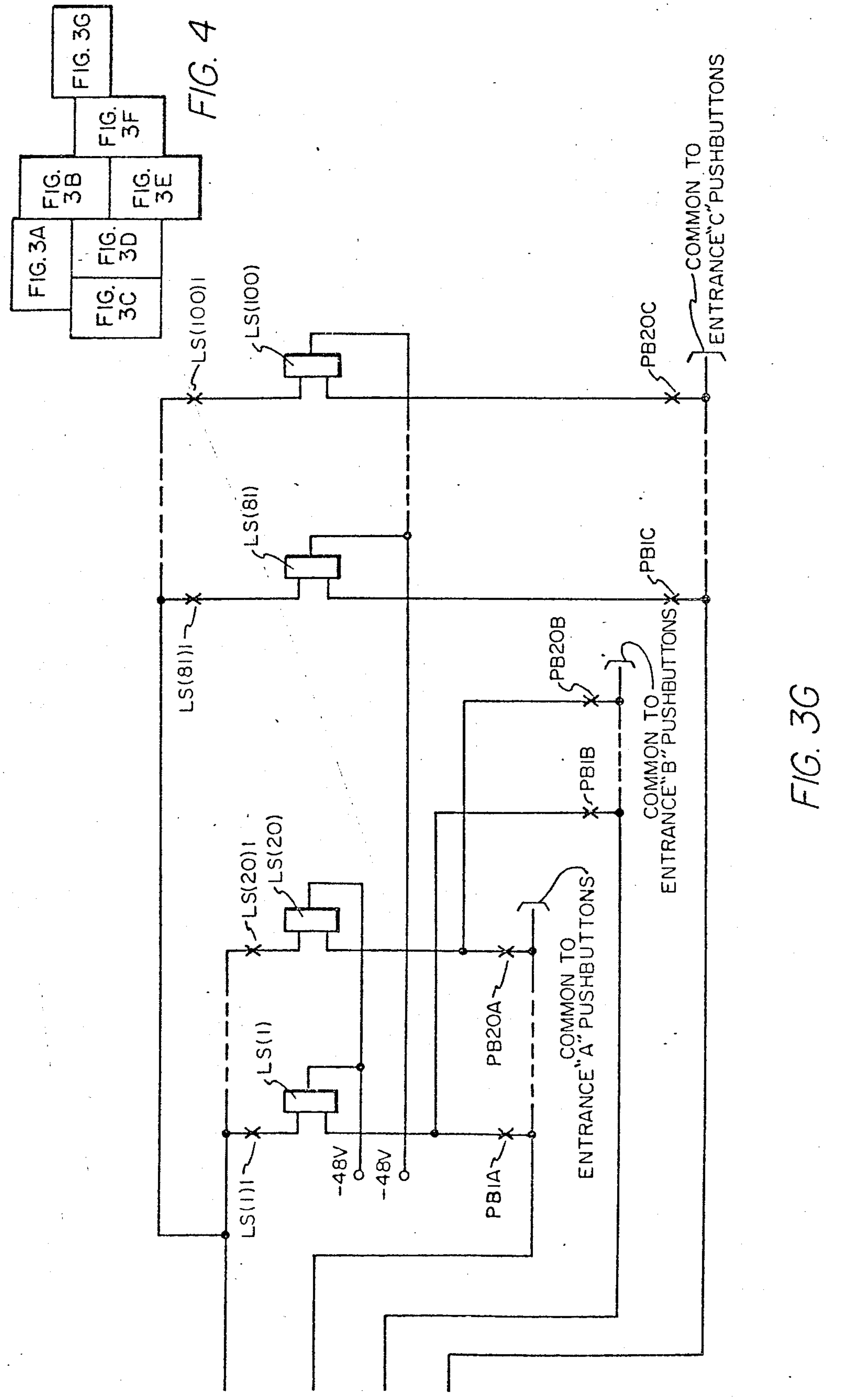
FIG. 4 illustrates in schematic form how the various parts of FIG. 3 should be placed in relation to each other in order to provide a complete circuit configuration.

Relay LS upon operating, at LS1 holds relay LS from battery, upper winding of LS, LS1, winding of relay LO, FIG. 3F, TO2, JJ4B, J4B, SB3B, to ground at the reset button or, alternatively, at the hookswitch springs of entrance A, and relay LO operates in series over this circuit. Make contacts LS3 and LS5, FIG. 3A, extend the resident's telephone line towards relay L, FIG. 3A, in the common switching equipment and make-before-break contacts LS7 and LS10 extend the central office line towards the H and Z relay bridge in the common equipment. Relay LO in operating, at LO1 removes ground from all pushbuttons and completes the operating circuit of relay G from battery, winding of G, FIG. 3B, FC2, CR307, make of LO1, FIG. 3F to ground. After a slow operate delay, relay FC operates in parallel with relay G; the same operating ground from L01 is also extended to activate the 24 volt power supply including, primarily, resistor R305, 24 volt zener diode CR578 and capacitor C308. This power supply serves to derive a 24 volt source from the 48V central battery, for the purposes of powering the printed circuit card mounted timing and tone circuits (left of FIG. 3C) and the likewise printed circuit card mounted Touch Calling receiver (top of FIG. 3B).

Relay G upon operating, at G2 disconnects the operating circuit of relay CT, and at G3 holds relay G to ground via RT4. When relay FC operates it disconnects the operating circuit of relay G at FC2; at FC4, FIG. 3D, it disconnects the release circuit of minor switch MS; at FC5, FIG. 3E it connects ground to the Timer Start conductor, FIG. 3C; and at FC7 and FC9, FIG. 3E, it connects relay C, FIG. 3D, across the intercom line so that relay C operates over the following circuit; battery, upper winding of relay C, FC9, JJ4T and J4T, FIG. 3F, L2A, lower winding of relay AV, FIG. 1B, conductor L2', intercom station IS-A, conductor L1A', upper winding of relay AV, L1A, J7T and JJ7T, FIG. 3F, FC7, FIG. 3E, lower winding of relay C, to ground. AT FC11, FIG. 3F, the In-Service lamp (not shown) on the foyer panel is lit via the following circuit: battery, In-Service lamp, conductor LPA, FIG. 3F, FC11, LO1, ground. From the earlier description of the video control circuit, FIGS. 1A and 1B, under heading I above, it will be recalled that relay AV, in operating at this time, causes the operation of coaxial relay CMA, starts the panning device and opens the shutter of the camera at entrance A, and prepares the video control circuit for the transmission of the 15.75 KHz signal.

Relay C in operating, at C2, FIG. 3C, removes a shunt from jacks 6 and 7 of the timer; at C4, FIG. 3C, extends ground to the Pulse Start conductor of the timer, via F5B; at C6, FIG. 3B, prepares the operating circuit of relay CT; and at C8, FIG. 3D, prepares a holding circuit for relay F. After a delay of one second, the timer — the circuit details of which are of no pertinence and are not shown — applies ground to the TM' conductor to operate relay TM to the −24 volt supply. Relay TM, upon operating, at TM1, FIG. 3E, operates relay RT to its preliminary or X contacts, from battery, upper winding of RT, RT8, RP4T, TM1, FC5 to ground. The closure of RT1 completes a short circuit of the lower winding of RT via RP2B, FC5 to ground. At the end of the pulse relay TM releases to remove the short circuit of the lower winding of RT and relay RT fully operates via both its windings in series.

When fully operated, relay RT holds itself at RT1 independent of the opening of the break of RT8, via RP2B and FC5 to ground; at RT4, FIG. 3B, it releases relay G; at RT6, FIG. 3C, it removes a shunt from jacks 2 and 4 of the timer to provide an 8-second time delay; at the make of RT8 prepares the operating circuit of relay RP; and at RT11 transfers −24 volts from conductor TC7 to conductor TC9 of the Touch Calling receiver circuit, if used. Relay G in releasing, at G2 completes a circuit for relay CT which extends from battery, winding of CT, G2, T2, C6 to ground; and at the same contact applies ground to conductor VS1. As explained in detail in Section I above, this results in the transmission of a burst of 15.75 KHz monitor-enabling tone over the telephone line of the selected apartment, in the instant case line RL, TL of apartment AT-1, FIG. 3B; and it also results in the switching through of the video signal from camera C-A, FIG. 1B, to the coaxial cable CC leading to the apartment monitors.

Relay CT upon operating, at CT2B, FIG. 3A, extends the negative side of the resident's line via the break of F4T, upper winding of relay F, to the level B wiper of rotary switch RS; at CT5B extends the positive side of the resident's line to ground at F2B; at CT8B, FIG. 3B, prepares an operating circuit for relay TO, FIG. 3E; at CT10B, FIG. 3A, connects C310 and R311 across the central office line — a precaution for those central office systems which test each line for an on-hook condition before connecting up the ringing generator. At preliminary make contact CT1T relay CT holds itself via G2 and C6 to ground; at CT4T, FIG. 3D, it disconnects the operating circuit of relay HD; at CT6T, FIG. 3A, transfers the Interrupted Tone Start conductor from a local circuit to the negative side of the central office line to prepare for signaling the resident if the central office call is received while an entrance call to the resident is in progress; and at CT9T, FIG. 3D, transfers the MS rotary magnet circuit from contacts L2 to contacts A2.

1.2 RINGING THE RESIDENT

In response to the closure, upon the operation of relay C, of ground to the Pulse Start conductor of the timer, a ground pulse of 0.5 seconds on and 0.5 seconds off is applied to the Pulse conductor to pulse relay P, FIG. 3C, and the rotary switch magnet RS, FIG. 3C, is energized from ground at P1 each time relay P operates, to step the wipers of this switch. Battery connected generator is extended via the level B wiper of RS, upper winding of relay F, FIG. 3D, F4T, CT2B, negative side of the line and the ringer in the resident's telephone AT-1, to the positive side of the line and ring return ground at F2B. This circuit, as will be noted from FIGS. 3B and 2A, includes conductors RO', TO' and RO, TO as well as the break portions of contacts PV1, PV2. Due to the stepping of the RS switch wipers once every half second and the strapping of the level B contacts in steps 4 and following of switch RS, a distinctive ring is applied to the resident's line, comprising 0.5 seconds on, 0.5 seconds off, 0.5 seconds on and a silent period of 4.5 seconds. As just mentioned, ringing current is not transmitted until rotary switch RS reaches its fourth bank contact so that during steps 1 to 3 an initial delay of approximately 1 to 1.5 second is introduced. Advantage is taken of this initial period to insure the transmission of the burst of 15.75 KHz monitor-enabling tone over the resident's telephone line before the first splash of ringing current is applied to this line. Reference in this connection is made to the description of the video control circuit, FIGS. 1A and 1B, under heading I above. Furthermore, owing to the strapping of the level A contacts of switch RS, a standard ringback tone of 2 seconds on and 4 seconds off is extended via level A wiper, capacitor C312, neon lamp LP1, D4 over the entrance intercom line.

1.3 RESIDENT DOES NOT ANSWER

If the resident fails to answer the call from the lobby, relay TM operates after a delay of 8 seconds, from a ground pulse applied on the TM' conductor from the timer. Relay RP, FIG. 3E, operates to its first step, from battery, upper winding of RP, RT8, RP4T, TM1, FC5 to ground. Upon the closure of preliminary contact RP1T, ground via FC5 and TO4 is also applied to conductor VS2. However, this ground is without affect on relay PV, FIG. 1A, at this time since RV which opened the circuit to relay PV is still held operated over conductor VS1. Relay HDV, FIG. 1A, does operate over the VS2 conductor but the consequent closure of contact HDV1 is ineffective because of the open condition of the make of PV6.

On release of relay TM, the short circuit of the lower winding of RP is removed at TM1 and relay RP fully operates. Relay RP in operating, at RP2B releases relay RT; at RP4B, FIG. 3C, removes a shunt from jacks 4 and 10 to the timer to start a 20-second time delay; at RP5B, FIG. 3A, prepares a path for interrupted generator to timer jack 16; at RP7B, FIG. 3B, prepares an operating circuit for relay CT from the Touch Calling receiver; and at RP9B, FIG. 3F, prepares a start circuit for speaker microphone operation.

It may be mentioned at this point that, as indicated in FIG. 3F, the intercom station at each of the entrances may be adapted either for handset operation or, alternatively, for speaker microphone operation. If handset operation is used the visitor, in initiating an entrance call to a desired resident, depresses the corresponding pushbutton and lifts the handset, thereby actuating the associated switchhook contact. If the system uses a speaker microphone at the entrance the visitor needs only to depress the desired pushbutton to initiate a call. However in this case a pair of reset contacts is provided to enable the visitor to flash.

Reverting now to the operation of relay RP, at RP1T, FIG. 3E, the relay holds itself via TO4 and FC5 to ground; at RP4T it prepares an operating circuit of relay TO; at RP6T, FIG. 3A, prepares the central office line holding bridge; and at RP8T, FIG. 3D, prepares the operating circuit of relay LD.

Relay RT upon releasing, at RT4, FIG. 3B, prepares the holding circuit of relay G; and at RT6, FIG. 3C, applies a shunt across jacks 2 and 4 to the timer to provide a 20-second time delay in conjunction with RP4B. If the resident does not answer, after this further time interval of 20 seconds ground is applied to the TM' conductor from the timer to operate relay TM, which at TM1 closes a circuit to relay TO, FIG. 3B, which extends from battery through the winding of TO, RP4T, TM1, FC5 to ground. Relay TO, FIG. 3B, in restoring, at TO4 brings about the release of relay RP, at TO2, FIG. 3F, releases relays LO and LS; and at TO5 holds itself via FC5 to ground.

Relay LO upon restoring, at LO1 releases relay FC, FIG. 3B, and replaces ground to all the pushbuttons on the entrance panels. Relay LS in releasing, at LS7 and LS10 restores the resident's line to the central office. When relay FC releases it prepares the operating circuit of relay G at FC2; at FC5, FIG. 3E, relay FC releases relay TO; at FC7 and FC9 it opens the intercom loop circuit, thereby releasing relay C and also releasing relay AV, FIG. 1B, which restores the video control circuit to normal; and at FC11, FIG. 3F, it extinguishes the foyer In-Service lamp. On release of relay TO the operating circuit of relays LO and LS is reprepared at TO2.

Relay C in releasing, at C4, FIG. 3C, removes Pulse Start ground from the timer so that relay P stops pulsing. It also completes a homing circuit for the RS switch from battery, RS magnet, RS INT2, RS ON2, C4 to ground. In this fashion the switch is driven to the home position where the RS ON2 springs restore to disconnect the drive circuit. In this fashion the circuit is now restored to normal, viz. after a total time delay on the order of roughly 30 seconds.

1.4 RESIDENT ANSWERS

Let it now be assumed that the resident does answer the call from the lobby. When the resident lifts his handset relay F operates from battery connected generator, or battery, via the level "B" contacts and the wiper of switch RS, upper winding of F, F4T, CT2B, LS3, telephone line loop, LS5, CT5B, F2B to ground. This loop circuit also includes conductors RO', TO' and RO, TO, and the break side of contacts PV1, PV2, FIG. 2. Relay F upon operating, at F2B, FIG. 3A, transfers ground to provide a holding ground for relays LO, FIG. 3F and LS, FIG. 3G, independent of the reset button or hookswitch at the entrance. Also at F2B, relay F extends ground via RP9B, FIG. 3F, to the MA, MB or MC conductor, as the case may be, to turn on the microphone amplifier when a speaker microphone system is provided at the entrance. Contact F5B, FIG. 3C, disconnects ground from the Pulse Start conductor to release relay P, and it completes the RS switch homing circuit from battery, winding of magnet RS, RS INT2, RS ON2, F5B, C4 to ground; at F7B, FIG. 3E, prepares an operating circuit for relay TO; at its preliminary contact F1T relay F holds itself over a circuit that may be traced from battery over the lower winding of F, F1T, C8 to ground; at F4T, FIG. 3D, it extends the resident's telephone loop to operate relay A and disconnects ringing generator from the line; and at make-before-break contacts F6T, FIG. 3C, it short circuits jacks 1 and 7 of the timer momentarily during the "bunching" time of the contact while operating, to reset the timer for an approximate 2 minute time interval.

Relay A upon operating at A2 closes a circuit to relay B, extending from battery, winding of B, CR309, A2 to ground. Relay B in operating, at B2, FIG. 3C, removes a shunt across jacks 7 and 10 of the timer to provide the aforementioned 2 minute time delay interval; at B4 disconnects the release circuit of the MS switch; at B6 and B9 prepares the operating circuits of relays D and SB respectively; and at B11 prepares an operating circuit for relay TO from bank contact 3 of minor switch MS. The resident and the visitor can now converse.

1.5 TIMED CONVERSATION — FORCED RELEASE

A 2 minute time interval is provided to limit the conversation time between the resident and the visitor. After 2 minutes ground will be extended to operate relay TM and, consequently, relay TO is operated from battery, winding of TO, RP4T, TM1, FC5, to ground. The operation of relay TO releases relays RP, LO and LS, followed by FC and restores the common equipment and also the video control circuit to normal, as described under 1.3 above. As a result the resident is reconnected to the central office line and the entrance intercom telephone is disconnected.

1.6 RESIDENT OPENS ENTRANCE DOOR

To allow the visitor access to the apartment the resident dials the digit "6". Relay A, FIG. 3D, responds to the dialed impulses and on the first release of A2, relay D operates from battery, winding of D, B6, A2 to ground. Relay D holds during impulsing, because of the diode connected in shunt with its winding. Relay D in operating, at D2 disconnects the MS wiper circuit during stepping; at D4 and D6 disconnects relay C from the capacitors of the intercom transmission bridge to prevent clicks from the pulsing of relay A from being heard by the visitor; at D7, FIG. 3C, extends battery to the reset conductor to reset the timer; at D9 prepares the circuit of the MS rotary magnet, and at D11, FIG. 3E, prepares an operating circuit for relay TO.

On each operation of relay A the MS rotary magnet is energized from battery, magnet winding, D9, CT9T, A2 to ground. The MS wiper is stepped around to the sixth outlet. At the end of the impulse series relay D releases.

Relay D in restoring, at D2, FIG. 3D, operates relay SB from battery, winding of SB — and in parallel therewith lamp LP2, B9, MS bank contacts 6, MS wiper, R2, D2, LD2B to ground; at D4 and D6, FIG. 3D, connects up the intercom line transmission bridge; at D7, FIG. 3C, disconnects the reset circuit of the timer; at D9 disconnects the circuit of the MS magnet; and at D11 disconnects the operating circuit of relay TO.

Relay SB in operating, at SB1B applies ground from LO1, FIG. 3F, via diode CR320, contacts JJ6B and J6B to conductor DLA to cause the operation of the door lock relay (not shown) at entrance A, and at the same contact provides a locking ground for SB via CR318; at SB3B transfers the holding ground of relays LO and LS from the hookswitch springs, or the reset button, at entrance A to the door release contact at this entrance via conductor RLA; at SB6B transfers the holding ground of relays LO and LS to the door release contact at entrance B, in case the call should have originated at entrance B; at SB7T transfers the holding ground of relays LO and LS to the door release contact at entrance C, in the event the call originated at this last-mentioned entrance; at SB1T, FIG. 3C, extends ground to the Tone Start conductor of the timer; at SB3T shunts jacks 7 and 9 to the timer to provide an 8 second timed delay interval during which period the door will remain unlocked; and at SB5T, FIG. 3D holds relay A from battery, lower winding of A, F4T, SB5T, resistor R307 to ground. In response to the grounding of the Tone Start conductor a 260 Hz tone is returned from jack 17 of the timer to the negative line of the resident's telephone, to indicate that the door lock has operated. The resident can hang up but, as indicated above, relay A holds from ground via SB5T until the end of the 8 second time out period.

1.7 DOOR LOCK TIMED HOLD AND RELEASE

As has just been mentioned, a time delay of 8 seconds is provided during which the visitor can open the entrance door. If the door is not opened before the end of this period ground is applied from the timer on the TM' conductor to operate relay TM. The latter relay, at TM1, FIG. 3E, operates relay TO from battery, winding of TO, RP4T, TM1, FC5, to ground. The operation of relay TO releases relays LO and LS, followed by the release of relays FC and SB. Relay FC in restoring, at FC4 energizes the MS switch release circuit which may be traced from battery via release magnet winding MS RLS, MS ON2, FC4 to ground. Relay R being connected in parallel with MS RLS, also operates over this circuit. Contact FC5 of relay FC releases relay TO; contacts FC7 and FC9 open the entrance intercom loop, which causes relay C, as well as the video control circuit, FIGS. 1A and 1B, to restore to normal; and at FC11 the entrance In-Service lamp is disconnected.

Relay R upon operating, at R2 disconnects the MS wiper circuit and at R3 maintains ground to hold release magnet MS RLS during the release operation. When relay C restores it resets the timer circuit at C2, FIG. 3C, releases relay CT at C6, FIG. 3B, and at C8, FIG. 3D, releases relay F. Relay SB upon restoring, at SB1B, FIG. 3F, removes ground from conductor DLA to release the door lock relay; at SB3B restores the whole circuit for relays LO and LS to the hookswitch springs, or the reset button contact at entrance A; at SB1T, FIG. 3C, removes ground from the Tone Start conductor; and at SB5T, FIG. 3D, releases relay A. The release of relay A is followed by that of relay B and the common equipment circuit restores to normal.

1.8 VISITOR OPENS DOOR — DOOR RELEASE CONTACTS

A switch is provided on each entrance door so that on opening of the door by the visitor the common equipment can be restored to normal. As mentioned above, after digit "6" was dialed by the resident, relay SB operated to transfer, at SB3B, the holding ground of relays LO and LS from conductor RSA and the hookswitch springs, or reset button contact to conductor RLA and the door release contact. As soon as the visitor, during the 8 second time interval referred to in Section 1.7 above, opens the door the holding ground is disconnected at the door release contact, relays LO and LS, followed by relay FC, are released and the common switching equipment circuit and the video control circuit are restored to normal as described above in Section 1.7.

1.9 RESIDENT DENIES ENTRANCE TO THE VISITOR

The visitor may only wish to converse with the resident but if he wants to be admitted to the building the resident can refuse access to the visitor — for example, if after viewing the visitor on the monitor screen in his apartment the resident decides that admission of the visitor would not be advisable. In either case, at the end of the conversation the resident hangs up his handset. The following relays FIGS. 3A to 3F, are in operates condition during the conversation; A, B, C, F, FC, CT, LO, LS and RP. When the resident hangs up, relay A releases and relay D operates from battery, winding of D, B6, A2 to ground. Relay D in operating, at D7, FIG. 3C, resets the timer and at D11, FIG. 3E, prepares an operating circuit for relay TO. Upon opening of A2, relay B releases at the end of its slow release period.

Relay B upon restoring, at B6 releases relay D but during the slow release of D operates relay TO from battery, winding of TO, T4, F7B, D11, B6, A2 to ground. Relay TO in operating, at TO2, FIG. 3F, releases relays LO and LS; at TO4, FIG. 3E, releases relay RP and at TO5 holds relay TO via FC5 to ground until relay FC restores due to the opening of contact LO1. Relay FC upon releasing, at FC5, FIG. 3E, disconnects the Timer Start circuit and releases relay TO; at FC7 and FC9, FIG. 3E, opens the entrance intercom line, thereby releasing relay C and the video control circuit, FIGS. 1A and 1B, and at FC11, FIG. 3F, disconnects the entrance In-Service lamp. With relay C released, relay CT, FIG. 3B, is restored at C6 and relay F, FIG. 3D, is released at C8. The common equipment is now restored to normal.

2. VISITOR TO RESIDENT CALL — RESIDENT BUSY ON A CENTRAL OFFICE CONNECTION

This section concerns itself with the case in which, at the time the visitor operates the apartment pushbutton on the entrance panel, the resident is either conversing with a central office party, or is in the process of dialing a number.

2.1 CENTRAL OFFICE LINE HOLDING BRIDGE

The common equipment differentiates between a local area central office connection and a toll call, depending on the presence or absence, respectively, of line potential reversal when such outgoing calls are answered. Two different holding bridges are provided to accommodate these two conditions. As explained in detail below, local holding relay H becomes operative on connections where the distant line potential is reversed and it, in turn, reverses the polarity of the battery and ground circuit, FIG. 3A, to relay L for receiving dial pulses from the resident's telephone line for the purpose of switching this line from the central office line to the foyer. The second holding relay, Z, serves as the holding bridge on toll calls.

2.2 SEIZURE FROM ENTRANCE A

Assuming now that, while the desired resident is busy in a central office call, a visitor at entrance A initiates a call to this resident by depressing the pushbutton of the corresponding apartment, relays LS and LO are operated as above described under heading 1.1. However in the instant case relay L, FIG. 3A, which acts as a supervisory relay for all the telephone lines, such as RL, TL, in common is interposed, in response to the operation of line relay LS, in the central office loop. This loop may now be traced as follows: apartment telephone AT-1, FIG. 3B, line conductors RL, TL, make contacts LS3, LS5, FIG. 3A, of line relay LS, conductor RO, TO, contacts PV1, PV2, FIG. 1A, break contacts CT2B, CT5B, FIG. 3A, upper and lower windings of relay L, break side of make-before-break contacts LD3B, LD5T, make side of make-before-break contacts LS10, LS7, central office line R, T to battery and ground at the battery feed relay (not shown) in the central office. Due to the operation of L in this loop circuit, relay T, FIG. 3D, operates in a circuit extending from battery over the winding of relay T, CR313, to ground at L2; and as a result the operating circuit of relay CT, FIG. 3B, is disconnected at T2, the operating circuit of TO, FIG. 3E, is disconnected at T4, the operating circuits of relays LD, HD and K, FIG. 3D, are prepared at T5, and the holding bridge circuit is prepared at T7.

Relay LO, in operating as previously described, operates relay G, followed by relay FC, and it also completes the circuit of the 24 volt zener diode regulator. Relays G and FC in operating perform the same functions as described in section 1.1, which include starting the timer circuit and operating relay C over the entrance intercom loop.

It will be recalled that, as a consequence of the operation of relay C and after the lapse of a 1-second time interval, a ground pulse is extended from the timer on the TM' conductor to operate relay TM, whereby relay RT, FIG. 3E, is operated to its first step at TM1. The one-second time delay is required to allow relays L and T to operate before relay RT operates. It will be remembered that operation of relay RT releases relay G so that if relay T were not operated there would be an operating path for relay CT from battery, winding of CT, G2, T2, C6, to ground. If relay CT were allowed to operate at this stage the resident's line would be immediately switched to the entrance at CT2B and CT5B, FIG. 3A. Furthermore, if relay T were not operated, the operating ground for relay CT would be applied, over the VS1 conductor, to the video control circuit, FIGS. 1A and 1B, which would cause the 15.75 KHz monitor-enabling signal to be prematurely terminated over the resident's telephone line.

At the end of the ground pulsing, relay TM releases to remove the short circuit of the lower winding of RT and relay RT fully operates via both its windings in series. As will be recalled, relay RT in operating, at RT1 holds itself over both its windings, at RT4 releases relay G, and at RT6 removes a shunt from jacks 2 and 4 of the timer to provide an 8-second time delay.

2.3 RESIDENT DIALING WHEN VISITOR CALLS

It may be mentioned here in passing that if the resident is in the process of dialing a central office number relay L will respond to the dial pulses. In this case, on the first release of L2, relay K, FIG. 3C, operates from battery, winding of K, T5, L2, to ground. Relay K holds during each train of impulses and at K1 shunts jacks 7 and 6 of the timer to restart the 8-second time interval; thus, until the resident has completed dialing no signal can be given of the visitor's presence.

2.4 RESIDENT SIGNALLED

In either case, at the end of the 8-second time interval, relay TM operates from a ground pulse on the TM' conductor of the timer. At TM1 relay RP operates to its first step, from battery, upper winding of RP, RT8, RP4T, TM1, FC5, to ground. On release of relay TM at the end of the pulse the short circuit of the lower winding of RP is removed at TM1 and the relay operates fully.

The functions of the operation of relay RP are substantially the same as described above under 1.3, including the release of relay RT at RP2B to provide the 20 second time interval allowed for the resident's answering; however in the instant case, due to relay CT being unoperated, interrupted generator is extended from level "B" of the RS switch, and its wiper, via RP5B, CT6T, to jack 16 of the timer to apply a 260/20 Hz intrusion tone from jack 17 to the RO side of the resident's telephone line. Moreover, in the present instance the holding bridge circuit across the central office line is completed from the T1 side of the line, via T7, CR307, winding of relay Z, RP6T, HD2 to the R1 side of the line.

Assuming the central office call is a toll call, relay Z will operate to normal battery and ground potential from the central office whereas relay H cannot operate due to diode 306. At Z1, relay Z holds to the central office battery and ground independent of T7. If, in the case of a local call, reversed potential is being returned from the central office to provide answering supervision relay H will operate instead of relay Z. Relay H in operating, at H2 and H5 prepares a direct battery and ground supply for relay L which is of the same polarity as that returned by the central office; and at H7 holds itself to the central office battery and ground independent of T7.

Reverting to the operation, mentioned at the beginning of this heading 2.4, of relay RP to its first step, ground was also supplied at that time to conductor VS2, namely via FC5, TO4 and preliminary make contact RP1T of relay RP, and in the video control circuit this results in the operation of relay PV, FIG. 1A, via diode CR11. As described above in Section I, this, in turn brings about the transmission of a burst of the 15.75 KHz monitor-enabing signal over the selected tenant's telephone line; and it also causes the operation of relay HDV which, via HDV1 and PV6, places a bridge across the RO′, TO′ conductors to hold, via the break contacts of CI2B, CT5B and CD3B, LD5T, FIG. 3A, the central office line, and relays L and H or Z, during the transmission of the 15.75 KHz signal. It should also be noted that in view of the strapping of level B of rotary switch RS the first splash of intrusion or call waiting tone is sent over the resident's line only approximately 1 second after the called resident's monitor has been activated.

2.5 RESIDENT ANSWERS FOYER CALL

After viewing the picture of the visitor on his monitor screen and after hearing the intrusion signal, which is a 260/20 Hz tone, 0.5 seconds on, 0.5 seconds off, 0.5 seconds on and 4.5 seconds off, the resident can deal with the call in any of the following three ways:

a. place the central office connection on hold and switch to the visitor by dialing digit "3", or b. complete the central office call, hang up and wait for the visitor's ringing signal, or c. ignore the visitor's signal.

a. Resident Switches to Visitor

The resident dials digit "3". On the first release of relay L, relay LD, operates from battery, winding of LD, RP8T, diode CR319, T5, L2 to ground. Relay LD in operating, at LD2B disconnects the wiper circuit of minor switch MS; at LD3B, FIG. 3A, transfers the upper winding of relay L to H2; at LD1T, FIG. 3D, performs a function in connection with Touch Calling operation when used; at LD3T, FIG. 3C, prepares the MS rotary magnet circuit; and at LD5T, FIG. 3A, transfers the lower winding of relay L to H5.

Relay L is now extended via the make contacts of LD3B and LD5T and via contacts H2 and H5 to a local battery and ground supply of the same polarity as that of the central office line. As indicated above, this polarity is controlled by relay H being operated or not, depending on the potential of the central office line. When relay L reoperates at the end of the first dial pulse, the MS rotary magnet, FIG. 3D, is energized from battery, magnet winding, LD3T, CT9T, L2 to ground, and the wipers of switch MS are stepped to the first outlet. Relay L follows the dial pulses and the MS wipers are stepped on to outlet 3.

At the end of the impulse series, relay D which is slow to operate because of the diode connected in parallel with its winding, restores to complete the operating circuit of relay CT, FIG. 3B, from battery, winding of CT, G2, CT8B, CR321, MS level contact 3 and wipers, R2, D2, LD2B to ground. The simultaneous application of ground to conductor VS1 has no effect at this time. Relay CT upon operating, at CT2B and CT5B transfers the resident's line to the F relay, FIG. 3D, which operates over the telephone line loop as previously described; at CT10B, FIG. 3A, closes an alternative circuit for the central office holding bridge; and at CT9T transfers the MS rotary magnet circuit from contact L2 to contact A2.

With the operation of relay F, the circuit now functions as described under Section 1.4 above and the resident and visitor can converse. The central office party is held and cannot overhear the conversation between the resident and the visitor.

The resident can permit entrance to the visitor by dialing digit "6" or can deny entrance by dialing digit "3", to return to the central office party.

Assuming the resident dials digit "6", the operation of the circuit after the digit has been dialed is the same as that described in Section 1.6, with the exception that the resident does not hang up after hearing the tone indicative of the operation of the door lock. When the door is opened, the door release springs, FIG. 3F, will operate to release relays LS and LO so that, at LS7 and LS10, the resident's line is returned to the central office. The common switching equipment and foyer control circuits are restored to normal. If the visitor fails to open the door, the resident will have to wait for 8 seconds before being switched back to the central office party. For details reference is made to Sections 1.7 and 1.8 above.

Assuming now that the resident, wishing to return to the central office party after conversing with the visitor, again dials digit "3", relay A responds to the dial pulses and relay D operates and holds during dialing. The MS wipers are stepped to bank contact 3 and relay D releases at the end of impulsing to complete a circuit to relay TO which may be traced from battery through the winding of TO, T4, F7B, B11, CT8B, CR321, MS level contact 3, R2, D2, LD2B to ground. Relay TO upon operating, at TO2, FIG. 3F, releases relays LS and LO; at TO4 releases relay RP; and at TO5 holds relay TO via FC5 to ground. Release of relay LS transfers the resident back to the central office party and release of relay LO releases relay FC which restores the common switching equipment circuit and the video control circuit to normal.

b. RESIDENT ENDS CENTRAL OFFICE CALL TO ANSWER VISITOR

If the resident wishes to discontinue the central office call to answer the visitor he can hang up and wait for interrupted ringing. If the resident hangs up, relay L releases. At L2 the operating circuits of relays LD, K and HD are completed during the slow release of relay T. Relay HD in operating, at HD2 opens the holding bridge to release the central office connection. On release of relay T relay CT operates from battery, winding of CT, G2, T2, C6 to ground; and in parallel with the winding of CT ground is extended over conductor VS1 to the video control circuit to cause a burst of the 15.75 KHz signal to be transmitted over the telephone line as previously explained. With the operation of relay CT the circuit functions after an initial delay to ring the resident as described under Section 1.1 c. RESIDENT IGNORES VISITOR'S SIGNAL

If the resident ignores the intrusion signal as sent in accordance with heading 2.4 above, the circuit functions as described in Section 1.3 "Resident Does Not Answer." After a 20 second time interval relay TO is operated to restore the common switching equipment to normal, disconnect the entrance telephone and release the video control circuit.

3. TWO PARTY LINE SERVICE

The system will also operate to provide individual service to each resident selectively where two residents are connected to the same central office line in party-line fashion. In this case each of the two residents is assigned a line relay associated with a pushbutton on the foyer panel. For the details of this general arrangement reference is made to the above U.S. Pat. No. 3,484,561 to Matthews. From the description given hereinabove it is evident that each such party line subscriber can be provided with video service in the same manner as one connected to an individual line.

4. ENTRANCES B AND C

As mentioned above, the system shown herein by way of example is arranged for a maximum of three entrances each having a separate entrance panel. Relay J, FIG. 3F, functions for entrance B and relay JJ for entrance C.

When an apartment button of the entrance panel at entrance B is depressed, relay LS operates from battery, lower winding of LS, pushbutton springs, upper winding of J, resistor R306, LO1 to ground. Relay J operates in series with relay LS to close its preliminary, or "X", contacts. Preliminary contact J1B prepares the full operation of relay J; and preliminary contact J1T operates relay LO from battery, upper winding of LS, contact LS1, winding of LO, TO2, J1T, SB6B, to ground via the operated hookswitch springs or the reset button contact. Relay LO in operating, at LO3 disconnects ground from all pushbuttons and it fully operates relay J from battery, lower winding of J, J1B, LO1 to ground.

Relay J in fully operating, at J4B disconnects holding ground from entrance A; at J6B disconnects the door lock relay circuit of entrance A and prepares the door lock relay circuit of entrance B; and at J4T and J7T transfers the intercom line conductors from relay AV, FIG. 1B, and the intercom station IS-A at entrance A to relay BV and the intercom station IS-B at entrance B.

The operaton of relay JJ is similar to that just described for relay J except that this relay serves to transfer the control of the system to entrance panel C.

5. TOUCH CALLING OPERATION

A Touch Calling receiver unit can be added to permit the system to function from Touch Calling telephone instruments. If this unit is added the system can operate from a mixture of rotary dial type and dual-tone multifrequency or Touch Calling type telephones in the apartments. From FIGS. 3A and 3B it will be noted that the Touch Calling receiver is connected to conductors RO', TO' of the intercom line via connections TC1 and TC2 and it is over this path that the Touch Calling signals from the correspondingly equipped apartment telephones are impressed on the Touch Calling receiver. The remaining connections TC3 to TC10, are control connections which serve for the transmission of controls between the Touch Calling receiver and the common switching equipment to enable the latter to function substantially as if the resident's telephone were equipped with a rotary dial - as was the assumption in the above description. These controls, of course, include signals sent by the Touch Calling receiver and designed to bring about switching operations in the common switching equipment substantially duplicating those caused by switch MS if advanced to position 3 or 6 in response to the corresponding number of releases of dial pulse receiving relay A. In both cases digits "3" and "6" are used to bring about the operational results previously mentioned.

For an understanding of the functioning of the common switching equipment under the control of the Touch Calling receiver a showing of the circuitry of this receiver is not required. The following brief description of the principal operations involved will suffice.

5.1 VISITOR TO RESIDENT CALL — RESIDENT'S LINE IDLE

The seizure and signaling between the visitor and resident is the same as described in Section 1 up to the operation of opening the entrance door. To allow the visitor to enter the resident depresses the key of digit "6" for a period of 2 secnnds. After a delay of 1.5 second, relay SB, FIG. 3D, operates from battery, winding of SB, B9 to ground applied by the Touch Calling receiver to conductor TC3. Relay SB in operating, at SB1B operates the door lock relay (not shown) by applying ground to conductor DLA, FIG. 3F, via LO1, SB1B, CR320, JJ6B and J6B; at SB3B transfers the holding ground of relays LO and LS from the hookswitch springs to the door relay contact of entrance A via conductor RLA; at SB3T, FIG. 3C, shunts jacks 7 and 9 of the timer to provide an 8 second time delay interval during which period the door will remain unopened; and at SB5T holds relay A to ground via resistor R307. The door-lock timed-hold and release functions are as described in Sections 1.7 and 1.8.

5.2 VISITOR TO RESIDENT — RESIDENT BUSY ON CENTRAL OFFICE CONNECTION

In case the resident's line is busy at the time the equipment is seized by a visitor pressing an apartment button on the foyer panel the operation follows that described in Section 2.

If the resident is in the process of keying the digits of a central office number, relay K is operated, as each key is depressed, from battery, winding of K to ground applied to conductor TC8 by the Touch Calling unit. Due to the operation of relay K jacks 6 and 7 of the timer are shunted to restart the 8 second time interval.

If the resident is keying digits on a data connection when the visitor calls, relay K will be operated to restart the 8 second interval each time a key is depressed and the visitor will be unable to signal the resident. To prevent the common equipment being held busy from the above cause a 30 second timing circuit is provided in the TC receiver so that after 30 seconds relay TO is operated to release the equipment. Relay TO operates from battery, winding of TO, to ground applied by the Touch Calling receiver on conductor TC6.

If, however, the visitor tires of waiting for the 30 second period and, assuming the resident is out, hangs up the handset, the common equipment will release automatically on removal of the holding ground from the operated hookswitch springs on the RSA conductor, to release relays LO and LS.

At the end of the 8 second time interval the resident is signalled as described in section 2.4, by application of the 260/20 Hz intrusion tone, preceded by the transmission of the 15.75 KHz monitor-enabling signal. On hearing the intrusion tone the resident has the same options as described in section 2.5. It will suffice here to briefly describe the operation if the resident, in accordance with option (a) above, wishes to switch to the visitor.

The resident depresses digit key "3" for about 2 seconds. After 250 milliseconds relay LD, FIG. 3D, operates from battery, winding of LD, RP8T to ground applied on conductor TC8 by the Touch Calling unit. Relay K also operates in parallel with LD to reset the timer at K1. Relay LD, upon operating, at LD1T operates relay D to ground on conductor TC4; at LD3B transfers the upper winding of relay L to H2; and at LD5T transfers the lower winding of relay L to H5.

Relay L is now extended via LD3B and LD5T to local battery and ground to maintain the battery supply to the tone generator of the Touch Calling telephone.

At the same time the central office party is placed on hold and disconnected from the Touch Calling tones applied to the line during the period the digit key is depressed. The operation of relay D disconnects the transmission bridge to the entrance telephone at D4 and D6, to prevent the Touch Calling tone being heard by the visitor while the digit key is depressed. After a delay of 1.5 second, a circuit is closed to relay CT from battery, winding of CT, G2, CR21, RP7B to ground applied to the TC4 conductor from the Touch Calling receiver, and parallel to the winding of relay CT, ground is forwarded to the video control circuit via conductor VS1. At the same time a circuit is completed for relay T which extends from battery, winding of T, CR322, RP7B to ground on conductor TC4.

The energization of conductor VS1 results in the transmission by the video control circuit of the 15.75 monitor-enabling signal over the resident's telephone line. Relay CT, in operating, at CT2B and CT5B extends the resident's telephone loop to operate relay F, the operation of relay F extending the telephone loop to operate relay A, which in turn operates relay B; and at CT8B relay CT prepares an operating circuit for relay TO. The operation of relay T at this stage, at T4 prevents an operating circuit for relay TO from being completed after the closure of B11 and F7B, while the digit key is depressed.

When the resident restores digit key "3" relays LD, T and D restore, and the resident is connected to the visitor. With the operation of relay F, the circuit now functions as described in Section 1.4 and the resident and visitor can converse. The resident can now permit or deny entrance to the visitor by keying digit "6" or "3" respectively.

Assuming the resident wishes to admit the visitor to the building he depresses digit key "6" for a period of two seconds and relay SB operates from battery, winding of SB, B9, to ground applied to lead TC3 to reset the timer. The circuit now functions as described in Sections 1.6 and 1.7, with the exception that the resident does not hang up. When the door is opened, or after the 8 second time interval allowed for opening the door, the resident will be returned automatically to the central office connection.

If the resident wishes to return to the central office party after conversing with the visitor, digit "3" is keyed to operate relay TO from battery, winding of TO, T4, F7B, B11, CT8B, CR21, RP7B to ground applied to conductor TC4 by the Touch Calling receiver.

Relay TO in operating, at TO4 releases relay RP, at TO2 releases relays LO and LS, and at TO5 holds relay TO via FC5 to ground. After its slow operating period relay T operates to ground on conductor TC4. Relay LD operates via RP8T to ground on conductor TC8 and completes an operating circuit for relay D from battery, winding of D, CR323, LD1T, CR322, RP7B, to ground on conductor TC4. The operation of relay D disconnects the circuit to the entrance at D4 and D6 to remove the Touch Calling tone signal while the digit key is depressed, during the release of the common switching equipment. The resident is now returned to the central office connection.

The operations of options (b) and (c) under Section 2.5 occur in the same manner for Touch Calling as described above under those subsections.

It may also be mentioned at this point that Touch Calling operation could also — or alternatively — be applied to the intercom station at each entrance. In this case it would not be necessary to provide at each entrance as many pushbuttons as there are apartments but only a single Touch Calling dial — usually equipped with ten pushbuttons — would be provided at each entrance, and typically a plurality of sequential pushbutton operations, for instance three or four depending on the capacity of the system, would be required to select a desired apartment. In this context reference is also made to co-pending U.S. patent application Ser. No. 275,016 of W. Forrest, filed on July 25, 1972 on a Selection System with Key Pad Control, and co-pending United States patent application Ser. No. 275,023 of G. Verbaas, filed on July 25, 1972 on A Key Pad Control Arrangement. These co-pending applications describe a system arrangement in which pushbutton dials with D.C. control, rather than dual-tone multi-frequency control, are used in a particularly advantageous way. The invention is also applicable in systems in which rotary dials, rather than pushbuttons or pushbutton dials, are employed at the intercom station or stations.

6. NUISANCE CALLS

To enable the resident to disconnect from a nuisance vistor-to-resident call relay TO has a slow release of about two seconds during the depression of capacitor C8. When the resident hangs up on a nuisance call even though the visitor is holding down the apartment pushbutton on the panel, the common switching equipment cannot be re-seized for a period of two seconds until relay TO releases. This time interval will allow the resident to hang up momentarily to operate relay TO and disconnect relays LO and LS and then lift the handset and be extended to the central office. On hearing dial tone the resident can now call the building superintendent, or the police, as desired.

It is to be understood that while the present invention has been shown and described with reference to a preferred embodiment thereof, the invention is not limited to the precise form set forth and that various modifications and changes may be made therein without departing from the spirit and scope of the present invention.

For instance, although the invention has been described above in connection with a door intercom and entrance control system it should be understood that the invention, in at least some of its aspects, may also be applied to other systems involving both telephone and video communication and employing separate media for the transmission of voice and video. An example would be an educational institution providing for a central point where the control panel and cameras are located, and also providing for a plurality of classrooms, or groups of classrooms, each equipped with a TV monitor — typically complete with audio — and also equipped with a telephone apparatus and an associated line over which it can be selectively accessed. In applying the inventions to such a system the TV monitors in the classrooms could be selectively enabled to reproduce the lecture of a teacher or a tape recording of such a lecture.

The invention could also be applied to a hospital, factory or the like, where it is required to periodically check the situation existing in different areas. In this type of application each monitor would be replaced by a camera, and instead of the camera of the illustrated embodiment, a remote station monitor would be provided. In all these instances the corresponding video facility could be enabled over the individual telephone pair irrespective of whether or not a regular telephone call is in progress at the time.

What is claimed is:

1. A combination telephone and video communication system comprising:

first telephone apparatus and first video terminal apparatus at a predetermined location, a plurality of second telephone apparatus and second video terminal apparatus at a plurality of locations remote from said predetermined location, a plurality of two-wire telephone lines each individual to a corresponding second telephone apparatus for connecting said corresponding second telephone apparatus with said first telephone apparatus, video transmission means distinct from said telephone lines for connecting said second video terminal apparatus with said first video terminal apparatus, selecting means at said predetermined location for selectively extending a call to a desired one of said second telephone apparatus, switching means controlled by said selecting means for transmitting incident to said call, signalling current over the individual two-wire telephone line corresponding to said desired telephone apparatus, and video terminal apparatus control means at each of said remote locations and connected both to the corresponding two-wire telephone line and the corresponding second video terminal apparatus, the control means at the desired remote location being responsive to the receipt of said signalling current over said individual two-wire telephone line to automatically make the video operation of the corresponding video terminal apparatus effective.

2. A combination telephone and video communication system as claimed in claim 1, wherein said plurality of second video terminal apparatus are connected to said video transmission line in common.

3. A combination telephone and video communication system as claimed in claim 2, wherein said switching means are effective to first transmit an enabling signal of above-speechband frequency and then an inband calling signal over said individual two-wire telephone line, and wherein said control means include detector means tuned to the frequency of and responsive to said enabling signal.

4. A combination telephone and video communication system as claimed in claim 3, wherein said enabling signal is of a frequency corresponding to the horizontal oscillator frequency of the video system.

5. A combination telephone and video communication system as claimed in claim 3, wherein said first video terminal apparatus is a TV camera dnd said second video terminal apparatus are TV monitors, and wherein said switching means include means for switching the video output signal of said camera through to said common video transmission line.

6. A combination telephone and video communication system as claimed in claim 5, wherein said control means also comprise circuit means activated under the control of said video signal, when received after the receipt over said telephone line of said enabling signal, for holding said TV monitor, subsequent to the cessation of said enabling signal, in its activated state for the duration of said video signal.

7. A combination telephone and video communication system as claimed in claim 6, wherein said control means comprise guard means for inhibiting the enabling of said monitor in response to the receipt of a spurious signal of said above-speechband frequency if a signal of said frequency is received over said telephone line only subsequent to the receipt of said video signal over said transmission line.

8. An apartment building intercom system comprising, in separate apartments of said building, a plurality of telephone substations and a plurality of TV monitors, a plurality of separate two-wire central office subscriber lines for said substations, an intercom station and a TV camera at an entrance to said building, an intercom line terminated by said intercom station, a video transmission line common to said plurality of monitors for connecting said plurality of monitors with said camera, manually operable means at said intercom station for selecting one of said substations, switching means defining a point of juncture between each of said two-wire subscriber lines and said intercom line and permitting each said subscriber line to be divided into a substation section and a central office section, said switching means including:

means for supervising said two-wire subscriber lines, means jointly controlled by said manually operable means and said supervisory means for causing an inband calling signal to be transmitted over said substation section for signalling the selected substation and, prior to the transmission of said inband calling signal, also causing an enabling signal of above-speechband frequency to be transmitted over said substation section, and monitor control means at each said substation and connected both to the substation section of its corresponding two-wire line and the corresponding monitor, the control means at said selected substation being responsive to the receipt of said enabling signal to automatically activate, and display the picture at, the monitor corresponding to said selected substation.

9. An apartment building intercom system as claimed in claim 8, wherein said monitors are of the instant-on picture type.

10. An apartment building intercom system comprising, in separate apartments of said building, a plurality of telephone substations and a plurality of TV monitors of the instant-on picture type, a plurality of separate two-wire central office subscriber lines for said substations, an intercom station and a TV camera at an entrance to said building, an intercom line terminated by said intercom station, a video transmission line common to said plurality of monitors for connecting said plurality of monitors for connecting said plurality of monitors with said camera, manually operable means at said intercom station for selecting one of said substations, switching means defining a point of juncture between each of said two-wire subscriber lines and said intercom line and permitting each said subscriber line to be divided into a substation section and a central office section, said switching means including:

means for supervising said two-wire subscriber lines, means jointly controlled by said manually operable means and said supervisory means and including means effective, if said selected two-wire line is idle, to transfer the substation section of the selected two-wire line from the respective central office section to said intercom line, and to cause to be transmitted over said substation section first a burst of enabling signal current of above-speechband frequency and then inband ringing current for signalling the selected substation, and monitor control means at each said substation and connected both to the substation section of its corresponding two-wire line and the corresponding monitor, the control means at said selected substation being effective upon receipt of said enabling signal to activate the monitor corresponding to said selected substation, whereby the resident upon viewing the picture on the monitor, is provided with the option of leaving the telephone call unanswered if desired.

11. An apartment building intercom system as claimed in claim 9 wherein said jointly controlled means include means effective if the selected two-wire line is busy, to first cause a burst of enabling signal current to be transmitted over said substation section and, simultaneously therewith, a holding bridge to be connected across said central office section, and then cause a call waiting tone to be transmitted over said substation section.

12. An apartment building intercom system as claimed in claim 8, wherein said building has a plurality of entrances; wherein an intercom station, manually operable means and a TV camera are provided at each said entrance; and wherein there are provided means effective according to the identity of the intercom station from which a call to one of said substations has been originated, for selectively connecting the TV camera at the originating entrance to said video transmission line.

13. An apartment building intercom system as claimed in claim 12, wherein said TV cameras are continuously operating.

14. An apartment building intercom system as claimed in claim 8 wherein said common video transmission line is a single coaxial cable serving a plurality of floors of said building.

* * * * *